United States Patent
Yamaguchi et al.

(10) Patent No.: US 8,102,761 B2
(45) Date of Patent: Jan. 24, 2012

(54) PATH CONTROL DEVICE, PATH CONTROL METHOD, AND PATH CONTROL PROGRAM

(75) Inventors: Takao Yamaguchi, Osaka (JP); Atsushi Yoshida, Osaka (JP); Tomoki Ishii, Kyoto (JP)

(73) Assignee: Panasonic Corporation, Osaka (JP)

( * ) Notice: Subject to any disclaimer, the term of this patent is extended or adjusted under 35 U.S.C. 154(b) by 24 days.

(21) Appl. No.: 12/920,168

(22) PCT Filed: Nov. 24, 2009

(86) PCT No.: PCT/JP2009/006310
§ 371 (c)(1),
(2), (4) Date: Aug. 30, 2010

(87) PCT Pub. No.: WO2010/061573
PCT Pub. Date: Jun. 3, 2010

(65) Prior Publication Data
US 2011/0032818 A1    Feb. 10, 2011

(30) Foreign Application Priority Data
Nov. 28, 2008   (JP) ................. 2008-305398

(51) Int. Cl.
*G06F 11/00* (2006.01)

(52) U.S. Cl. .................... 370/225; 370/244

(58) Field of Classification Search .......... 370/216, 370/225, 242, 244, 245, 252, 254, 338
See application file for complete search history.

(56) References Cited

U.S. PATENT DOCUMENTS

| | | | |
|---|---|---|---|
| 2004/0136368 A1 | 7/2004 | Wakayama et al. | |
| 2009/0323519 A1* | 12/2009 | Pun | 370/225 |
| 2010/0027415 A1* | 2/2010 | So et al. | 370/225 |
| 2010/0061230 A1* | 3/2010 | Xiong et al. | 370/225 |
| 2010/0157792 A9* | 6/2010 | Johri | 370/225 |

FOREIGN PATENT DOCUMENTS

| | | |
|---|---|---|
| JP | 2000-92124 | 3/2000 |
| JP | 2001-136178 | 5/2001 |
| JP | 2004-221805 | 8/2004 |
| JP | 2005-347879 | 12/2005 |

OTHER PUBLICATIONS

International Search Report issued Mar. 2, 2010 in International (PCT) Application No. PCT/JP2009/006310.
Hossam Hassanein et al., "Routing with load balancing in wireless Ad hoc networks", ACM MSWIM' Jul. 1, 2001, pp. 89-96.

* cited by examiner

*Primary Examiner* — Brian Nguyen
(74) *Attorney, Agent, or Firm* — Wenderoth, Lind & Ponack, L.L.P.

(57) ABSTRACT

A path control device included in a terminal device (300), which includes a path information generating unit (302) which generates path information indicating paths from a terminal (300) to a terminal (400), a path malfunction predicting unit (303) which predicts a malfunction on each of the relays, using the number of flows as a malfunction occurrence likelihood value, at least one of the relays that is a candidate for monitoring is determined for each path, and a bypass path selecting unit (304) which selects, when the malfunction is predicted on the at least one relay, a path that should be used for transmitting the data from the terminal (300) to the terminal (400), from the paths except the path including the relay on which the malfunction is predicted.

13 Claims, 24 Drawing Sheets

| Identification number | IP address of transmission source | Port number of transmission source | IP address of destination | Port number of destination | Update time |
|---|---|---|---|---|---|
| 1 | A | 1000 | B | 2000 | T1 |
| 2 | C | 3000 | D | 4000 | T2 |
| 3 | C | 5000 | D | 6000 | T3 |

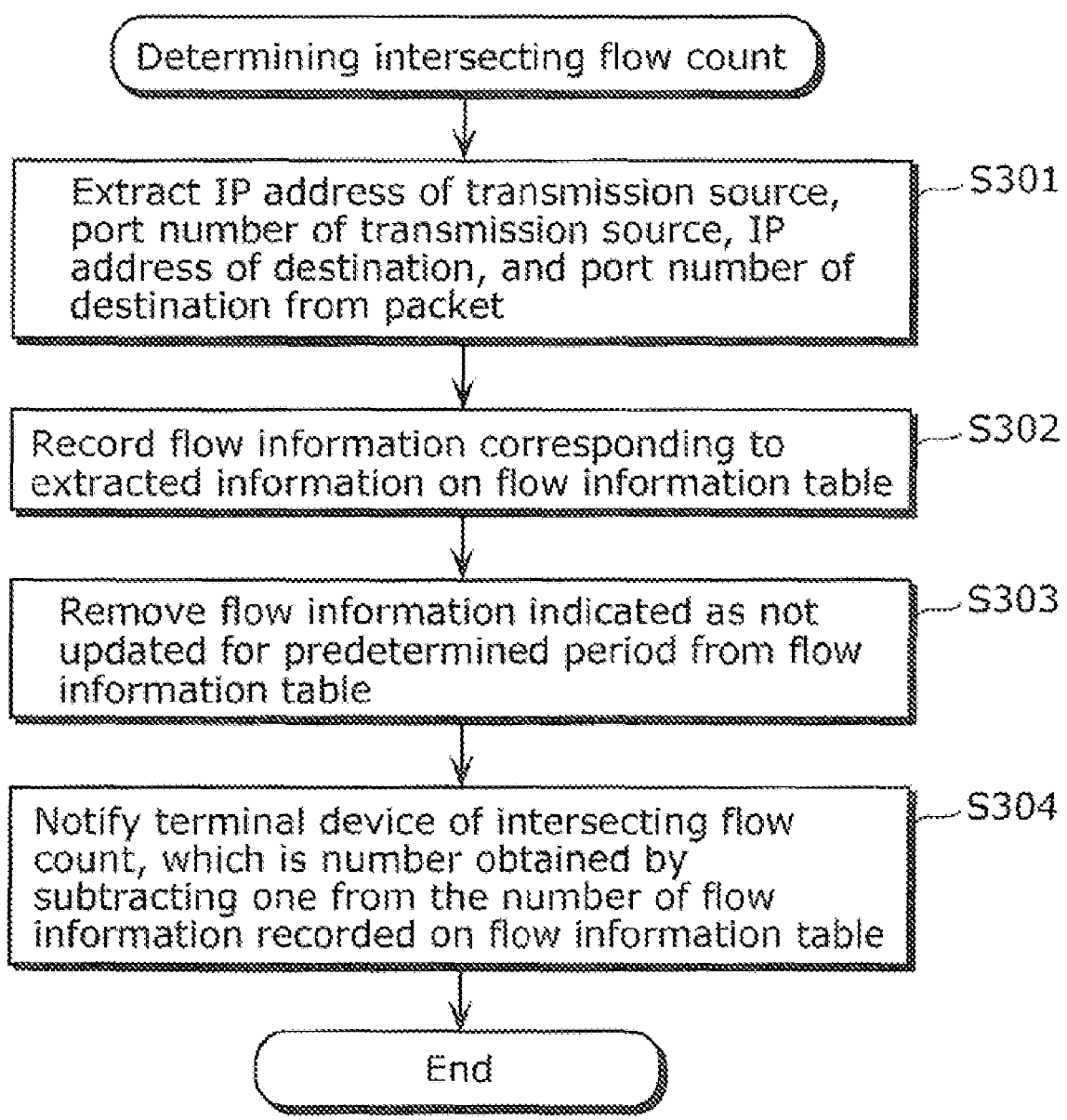

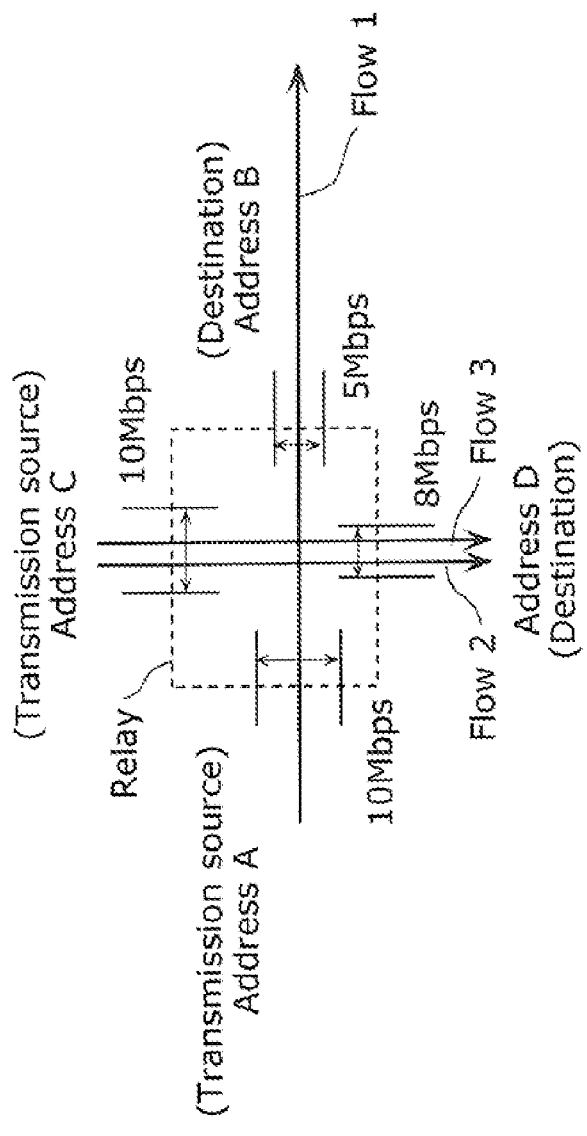

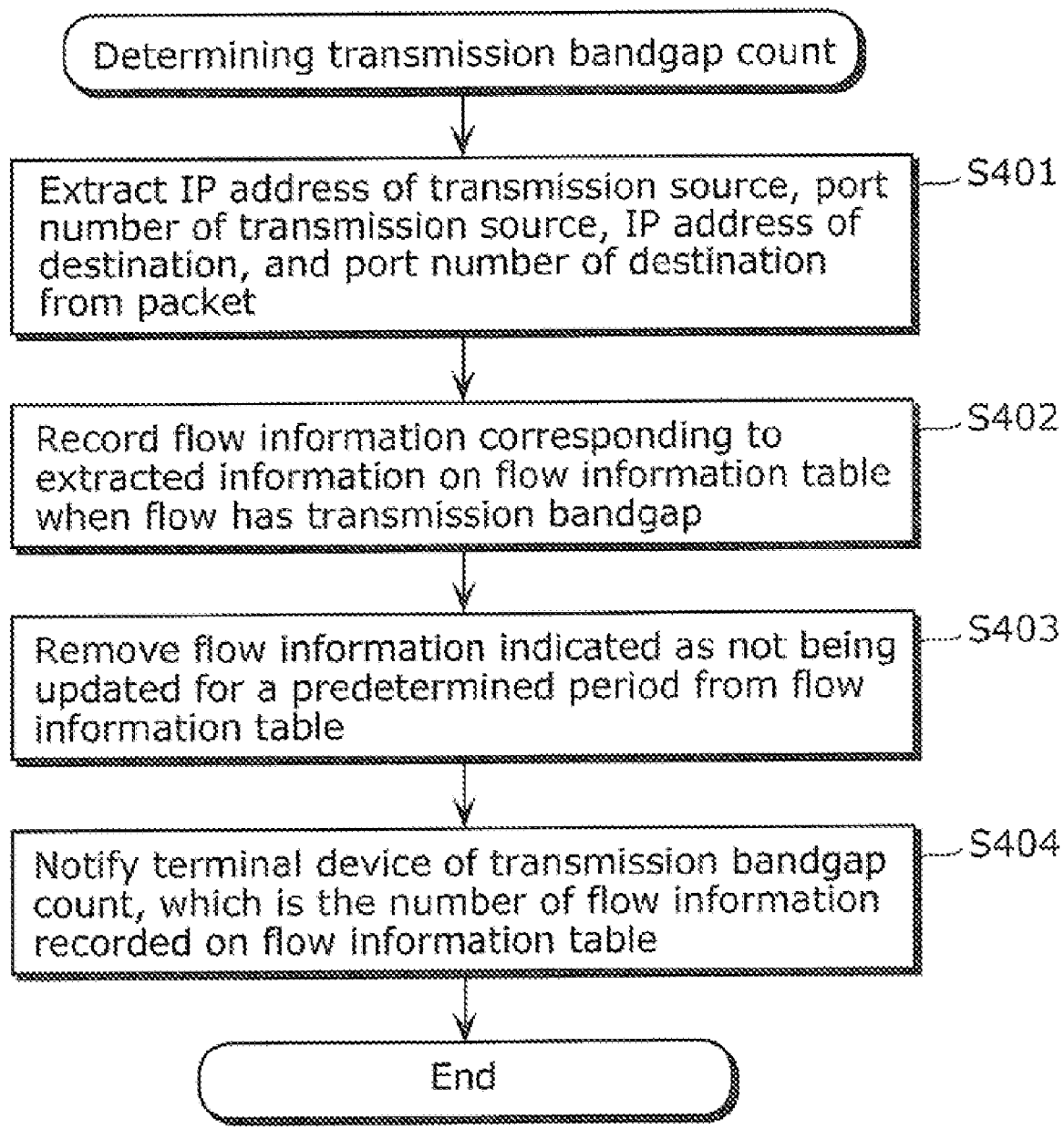

FIG. 14

| Relay identification number | Relay IP address | Malfunction occurrence likelihood value |
|---|---|---|
| 1 | fd00::21 | 5 |
| 2 | fd00::22 | 5 |
| 3 | fd00::23 | 5 |
| 4 | fd00::24 | 50 |

FIG. 15

| Relay identification number | Relay IP address | Malfunction occurrence likelihood value |
|---|---|---|
| 1 | fd00::21 | 0.87 |
| 2 | fd00::22 | 0.21 |
| 3 | fd00::23 | 0.65 |
| 4 | fd00::24 | 0.90 |

FIG. 19

| Relay identification number | Relay IP address | Normalized monitoring frequency value |
|---|---|---|
| 1 | fd00::21 | 0.34 |
| 2 | fd00::22 | 0.09 |
| 3 | fd00::23 | 0.24 |
| 4 | fd00::24 | 0.33 |

PATH CONTROL DEVICE, PATH CONTROL METHOD, AND PATH CONTROL PROGRAM

TECHNICAL FIELD

The present invention relates to a path control device, a path control method, and a path control program in a network which has multiple available transmission paths.

BACKGROUND ART

A mesh network which includes mutually connected terminal devices (personal computers, PDAs, mobile phones, in-vehicle devices such as car navigation systems have been in practical use.

The mesh network can actively compose the network adjusted to changes that occur when each terminal device joins or leaves the network or moves within the network; that is, the mesh network has flexibility lacking in the conventional fixed network. At the same time, when the terminal moves or when the wireless communication environment changes because of obstruction, there is a possibility of the problem that the quality of transmission degrades and the path for transmitting data is cut out.

In order to address this problem, in the mesh network, one path is actively selected among multiple transmission paths (also simply referred to as path) for use in transmitting data. The network in which the transmission paths are actively controlled is generally known as an ad hoc network.

Technologies for selecting preferable paths for highly reliable and high-quality data transmission in the ad hoc network have been known (for example, see Patent Literature 1 and Patent Literature 2).

Patent Literature 1 discloses a technology that collects the path information (for example, the number of retry and value indicating the load on a line) regarding the status of the relay on each path by transmitting the path examining frame to paths to the destination before or during the data transmission, determines the path to be used before the data transmission, using the collected path information. The technology also allows detecting the malfunction during data communication and switching the paths.

Patent Literature 2 discloses a technology for obtaining the total amount of traffic which causes delayed packets relayed by the relay included in the path, by transmitting a predetermined packet to each path, and, for transmitting the packets, using the path with smallest total amount of the obtained traffic.

[Citation List]
[Patent Literature]
[Patent Literature 1] Japanese Unexamined Patent Application Publication No. 2001-136178
[Patent Literature 2] Japanese Unexamined Patent Application Publication No. 2005-347879

SUMMARY OF INVENTION

[Technical Problem]

However, with the conventional technology, there is a first problem that the path cannot be quickly switched at the time of malfunction; that is, when the transmission quality on the path used for transmitting data degrades or when the malfunction which increases the load on the path occurs. The problem arises because the malfunction is detected after occurring, using the path information such as the number of retries, the value indicating the load on a line, and the total amount of traffic.

Furthermore, there is the second problem that no method that is suitable for collecting the path information with small resource (for example, communication amount, consumption power, required time) and that allows timely detection of malfunction.

For example, according to a method that simply does not collect the path information indicating malfunction that does not reach a predetermined threshold in order to limit the resource, the effect on limiting the resource and a risk for overlooking the malfunction contradicts depending on a threshold. As a result, it is difficult to find a suitable threshold.

The present invention has been conceived in view of these problems, and it is a first object to provide a path control technology that allows quick path switching on an ad hoc network.

A second object is to provide a path control technology that limits resources necessary for collecting the path information, and avoids overlooking possible malfunctions.

[Solution to Problem]

In order to achieve the abovementioned objects, the path control device according to the present invention is a path control device which controls a path for transmitting data from a transmission terminal to a reception terminal through relays, the path control device including: a path information generating unit which generates path information indicating paths for transmitting the data from the transmission terminal to the reception terminal; a path malfunction predicting unit which predicts a malfunction on each of the relays, using the number of flows as a malfunction occurrence likelihood value which represents likelihood of a malfunction on the relay, including a degradation in transmission quality and increased load, each of the flows being a sequence of one or more packets to be relayed from one transmission source to one destination by the relay which is a candidate for monitoring, at least one of that is determined for each path indicated by the path information; and a bypass path selecting unit which selects, when the malfunction is predicted on the at least one relay that is the candidate for monitoring on one of the paths, a path that should be used for transmitting the data from the transmission terminal to the reception terminal, from the paths indicated by the path information except the path including the relay on which the malfunction is predicted.

Furthermore, the path malfunction predicting unit may use, as the malfunction occurrence likelihood value, the number of flow relayed by each of the relays except the flow from the transmission terminal to the reception terminal.

Furthermore, the path malfunction predicting unit may use, as the malfunction occurrence likelihood value, the number of flows each of which is with a transmission band on a communication line for transmission narrower than a transmission band on a communication line for reception, among the flows relayed by each of the relays.

Furthermore, the path malfunction predicting unit may include: a monitoring frequency value storage unit which stores a monitoring frequency value indicating a frequency for monitoring a malfunction occurrence likelihood value of each of the relays that is the candidate for monitoring; a selection probability value generating unit which generates a selection probability value which is a predetermined probability value for each of the relays; a monitoring object determining unit which determines a relay a malfunction occurrence likelihood of which is to be monitored, according to the monitoring frequency value and the selection probability value; a malfunction occurrence likelihood value obtaining unit which obtains a malfunction occurrence likelihood value from the relay determined by the monitoring object determining unit; a malfunction occurrence likelihood value storage unit which stores the obtained malfunction occurrence likelihood value; an activation level calculating unit which calculates, using the stored malfunction occurrence likelihood value, an activation level indicating validity of the monitoring frequency value stored in the monitoring frequency value storage unit; and a monitoring frequency value updating unit which updates the monitoring frequency value stored in the monitoring frequency value storage unit, based on the activation level.

Furthermore, the bypass path selecting unit may determine a transmission quality value indicating transmission quality, of each of the relays that is the candidate for monitoring, and to select a path that should be used for transmitting the data from the transmission terminal to the reception terminal, from paths further excluding a path including a relay with transmission quality below a predetermined standard, the transmission quality being indicated by the determined transmission quality value.

Furthermore, the bypass path selecting unit may collect a load value indicating a level of load in a relay, from each of the relays that is the candidate for monitoring, and select a path that should be used for transmitting the data from the transmission terminal to the reception terminal, from paths further excluding a path including a relay with a level of load smaller than a predetermined standard, the level of load being indicated by the determined transmission quality value.

Furthermore, the path malfunction predicting unit may obtain malfunction size information indicating a size of malfunction occurring around the relay on which the malfunction is predicted, and prevent the bypass path selecting unit from selecting the path, when the size of malfunction indicated by the obtained malfunction size information is smaller than a predetermined standard.

Furthermore, the path malfunction predicting unit may obtain malfunction size information indicating a size of malfunction occurring around the relay on which the malfunction is predicted, and the bypass path selecting unit may select a path which has a largest hop count from the paths indicated by the path information except the path including the relay on which the malfunction is predicted, when the size of malfunction indicated by the obtained malfunction size information is above the predetermined standard.

Furthermore, the path control device may be provided on the transmission terminal or one of the relays.

The present invention may not only be implemented as the path control device, but also as a path control method or as a path control program.

[Advantageous Effects OF Invention]

As described above, according to the path control device of the present invention, malfunction on a relay is predicted using the number of flows to be relayed at the relay as a malfunction occurrence likelihood value, and a path that should be used for transmitting the data is newly selected, excluding a path including the relay on which the malfunction is predicted. With this, it is possible to perform quick bypassing before the degradation on the transmission quality or the increase on the load that would be reflected on the predetermined statistics actually occurs.

In addition, the malfunction occurrence likelihood value is collected from the relay stochastically selected according to the monitoring frequency corresponding to the likelihood of the malfunction and the collected malfunction occurrence likelihood value is used for predicting the malfunction. This limits the cost for monitoring (the amount of monitoring packet, consumption power, and time required for observation), and avoids overlooking malfunction stochastically.

BRIEF DESCRIPTION OF DRAWINGS

FIG. 8 is a flowchart illustrating an example of determining intersecting flow count.

FIG. 9A illustrates an example of transmission bandgap in the relay 200.

FIG. 9B illustrates an example of the flow information table.

FIG. 10 is a flowchart illustrating an example of determining transmission bandgap count.

FIG. 14 illustrates an example of data structure of the malfunction occurrence likelihood value table.

FIG. 15 illustrates an example of data structure of the monitoring frequency value table.

FIG. 19 illustrates an example of the data structure of the normalized monitoring frequency value table.

DESCRIPTION OF EMBODIMENTS

The following describes a path control device and a path control method according to the embodiment of the present invention with reference to the drawings.

(Overview of Path Control)

Figure 1:
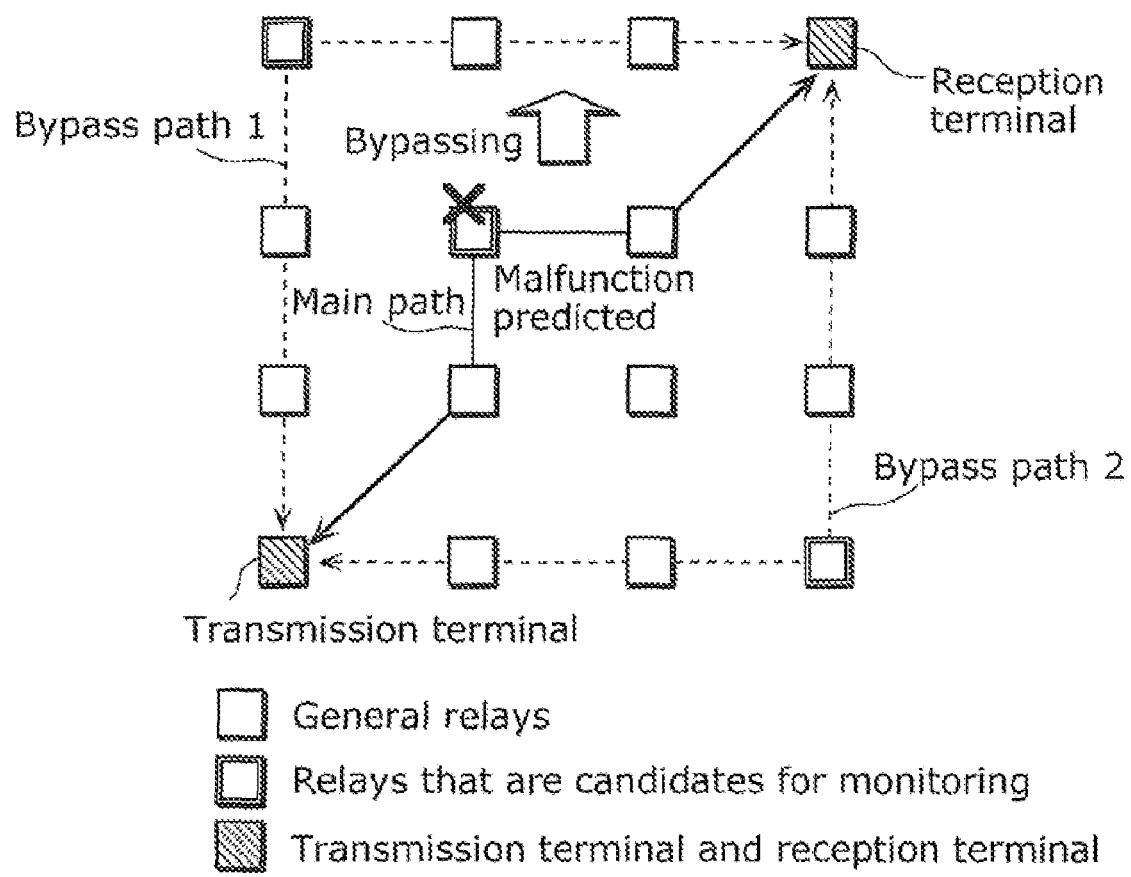
FIG. 1 schematically illustrates an example of an ad hoc network in which the transmission path is controlled according to the path control method of the present invention.

FIG. 1 schematically illustrates an ad hoc network in which the transmission path is controlled according to the path control method of the present invention.

FIG. 1 illustrates, for example, three paths from the transmission terminal to the reception terminal (one main path and two bypass paths) in an ad hoc network which is made up by mutually connecting relays through communication lines. Each path includes at least one relay which is a candidate for monitoring. The main path indicates the path currently used, and the bypass paths indicate standby paths.

In the ad hoc network illustrated in FIG. 1, when the malfunction of the relay being monitored is predicted and a new path to be used for transmitting data from the transmission terminal to the reception terminal is selected from among the paths except the path including the relay malfunction of which is predicted. Typically, when the malfunction of the relay on the main path is predicted, one of the bypass paths is selected as a new main path. The criteria for selecting the path shall be described in detail later.

The malfunction refers to a case where the relay's communication status falls out of the preferable communication status (degradation in transmission quality and increase in load are included, for example). Detecting a status where the malfunction is likely to occur is referred to as predicting the malfunction.

In the present invention, the number of flows relayed by the relay is used for predicting malfunction, as the malfunction occurrence likelihood value indicating the likelihood of the malfunction, instead of the statistic reflecting the actual malfunction, such as the retry count, the value indicating load on the line, or amount of traffic that is conventionally used for detecting malfunction. The flow refers to one or more sequences of packets to be relayed from one transmission source to one destination. What kind of flow count is counted as the malfunction occurrence likelihood value shall be described in detail later.

The malfunction occurrence likelihood value is collected periodically from the relay selected as the object to be monitored among the candidates for monitoring, according to a predetermined monitoring frequency. The monitoring frequency is determined, using the malfunction occurrence likelihood value that has already collected, such that the more likely malfunction occurs in a relay, the higher the monitoring frequency, while a relay with low malfunction possibility is to be selected less frequently. The relay to be selected as the monitoring object is stochastically selected by adding the selection probability value to the monitoring frequency.

According to the path control performed as described above, the number of flows relayed by the relay is used as the malfunction occurrence likelihood value to predict malfunctions. Thus, it is possible to predict the malfunction on the main path and switches the path to the bypass path, before the transmission quality actually degrades or the load increases, which are reflected on the predetermined statistics. This allows prompt bypassing.

In addition, the malfunction occurrence likelihood value is collected from the relay that is stochastically selected by adding the selection probability value to the monitoring frequency according to the likelihood of the malfunction, and the collected malfunction occurrence likelihood value is used for predicting malfunction. As a result, it is possible to limit the cost for monitoring (amount of monitoring packets, consumption power, time required for observation), and avoid overlooking the malfunction stochastically.

(Definitions of the Intersecting Flow Count and Transmission Bandgap Count)

The intersecting flow count and the transmission bandgap count are defined as examples of the malfunction occurrence likelihood value.

As described above, the malfunction occurrence likelihood value is the number of flows relayed by the relay, and indicates the likelihood of malfunction in the relay.

First, the definition of the intersecting flow count shall be described.

FIG. 2A to FIG. 2D illustrate intersecting flows.

As described above, the flow refers to one or more sequences of packets to be transmitted from one transmission terminal to one reception terminal. In other words, a sequence of one or more packets with the same IP address and the port number of the transmission source and with the same IP address and the port number of the destination is considered to be one flow.

When the relay relays multiple flows, one flow is defined as a focused flow, and a flow with at least one of an IP address and a port number of the source and an IP address and a port number of the destination different from those of the focused flow is defined as a flow intersecting the focused flow.

Figure 2B:
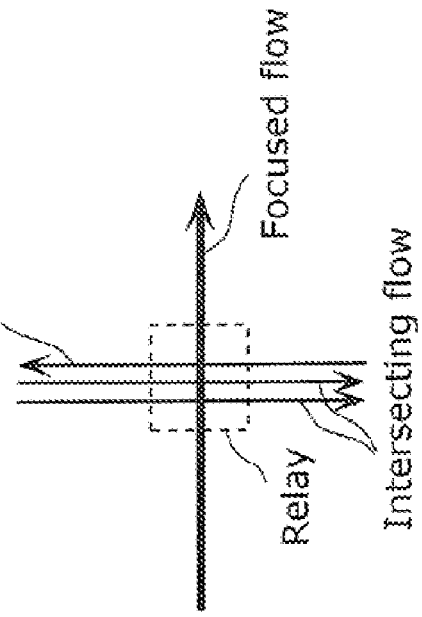
FIG. 2A to FIG. 2D illustrate intersecting flows.
Figure 2D:
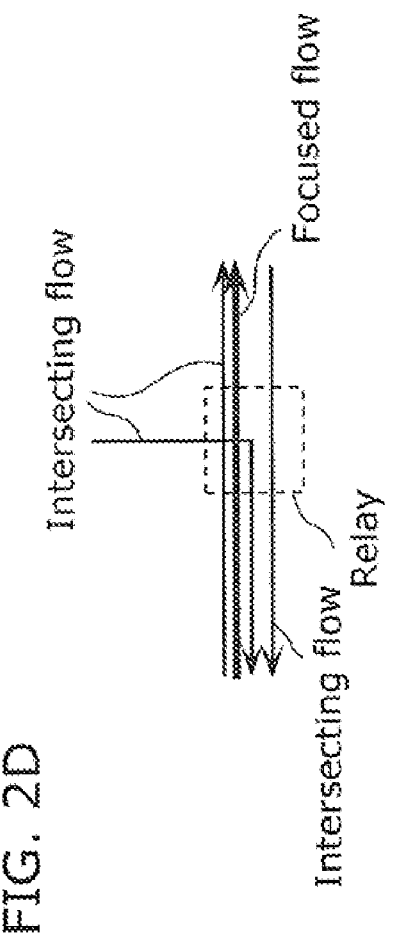
Figure 2A:
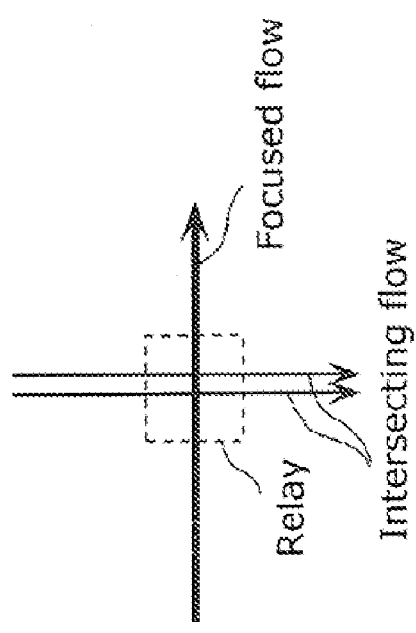

FIG. 2A schematically illustrates two intersecting flows with both IP address of the transmission source and the IP address of the destination different from those of the focused flow. Note that, the difference in the IP address is represented in the diagram as the difference in the direction from the relay.

FIG. 28 schematically illustrates three intersecting flows with is both IP address of the transmission source and the IP address of the destination different from the focused flow.

Figure 2C:
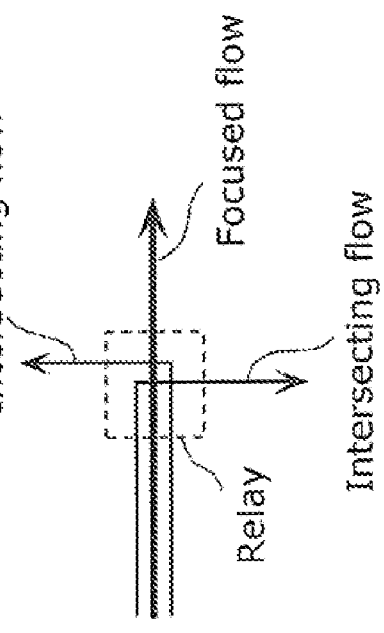

FIG. 2C schematically illustrates two intersecting flows with the same IP address of the source as the focused flow and different IP address of the destination.

FIG. 2D schematically illustrates an intersecting flow with the IP address of the transmission source different from that of the focused flow and IP address identical to that of the destination, and an intersecting flow with the IP addresses identical to that of the transmission source and the destination as the focused flow, but with at least one of the port numbers of the transmission source and the destination different from those of the focused flow.

In the present invention, the flow flowing from the transmission terminal to the reception terminal is defined as the focused flow, and the number of flows intersecting the focused flow at each relay is defined as the intersecting flow count.

The larger the intersecting flow count, the more likely the traffic to be relayed at the relay increases and the more likely the room for stability in response to the change in the wireless communication environment (such as the move of the devices and the change in obstruction) decreases. Thus, it is determined that the malfunction at the relay is more likely to occur.

Next, the definition of transmission bandgap count shall be described.

Figure 3A:
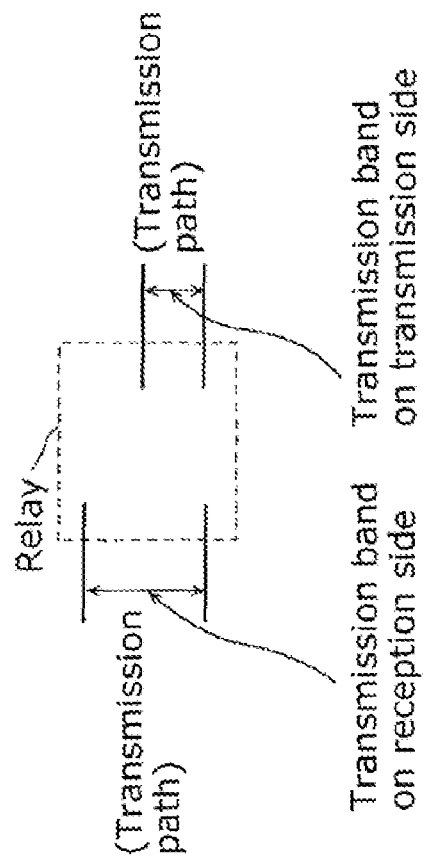
FIGS. 3A and 3B illustrate transmission bandgap in flow.
Figure 3B:
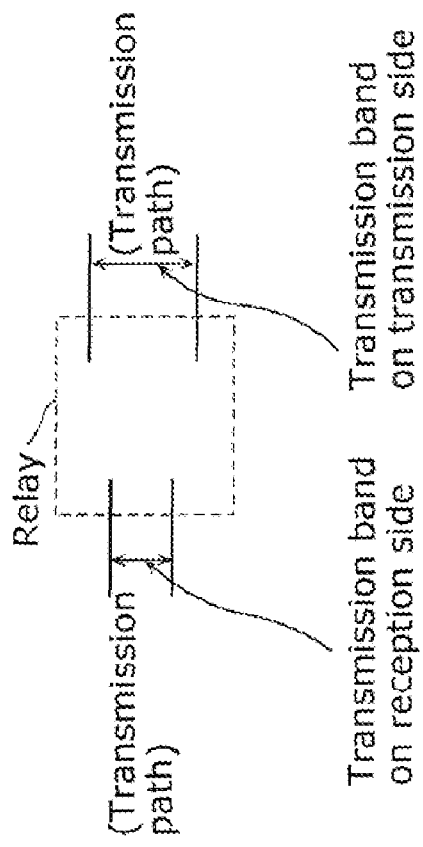

FIG. 3A and FIG. 3B illustrate the transmission bandgap that occurs in the flow.

A certain type of wireless communication standard defines that the transmission band is changed depending on the level of attenuation of the signal in the communication line. For example, IEEE 802.11a, 11g, which are standards for wireless LAN, define that the transmission band of the wireless link is gradually dropped from 54 Mbits/second to 48, 36, 24, 12, 9, 6 Mbits/second as the attenuation of the signal increases.

In the communication according to such a standard, there are cases where the transmission band of the wireless links significantly decreases due to the attenuation of the signal when a vehicle which functions as a relay for car-to-car communication moves, or when a truck which is an obstruction passes between base stations that are fixed on the road.

For one flow relayed by the relay, the transmission bands of the wireless link on the reception side and the transmission side generally vary independently.

FIG. 3A schematically illustrates a case where the transmission band of the wireless link on the transmission side is larger than the transmission band of the wireless link on the reception side.

FIG. 36 schematically illustrates a case where the transmission band of the wireless link on the transmission side is smaller than the transmission band of the wireless link on the reception side.

In the present invention, the case where the transmission band of the wireless link on the transmission side of the flow is smaller than the transmission band of the wireless link of the reception side of the flow is defined as the case where the transmission bandgap occurs. Furthermore, the number of flows with the transmission bandgap in the relay is defined as the transmission bandgap count.

The larger the transmission bandgap count, the more likely the packets staying in the buffer of the relay increases. Thus, it is determined that the malfunction on the relay is more likely to occur.

(Configuration of Network Including Path Control Device)

Figure 4:
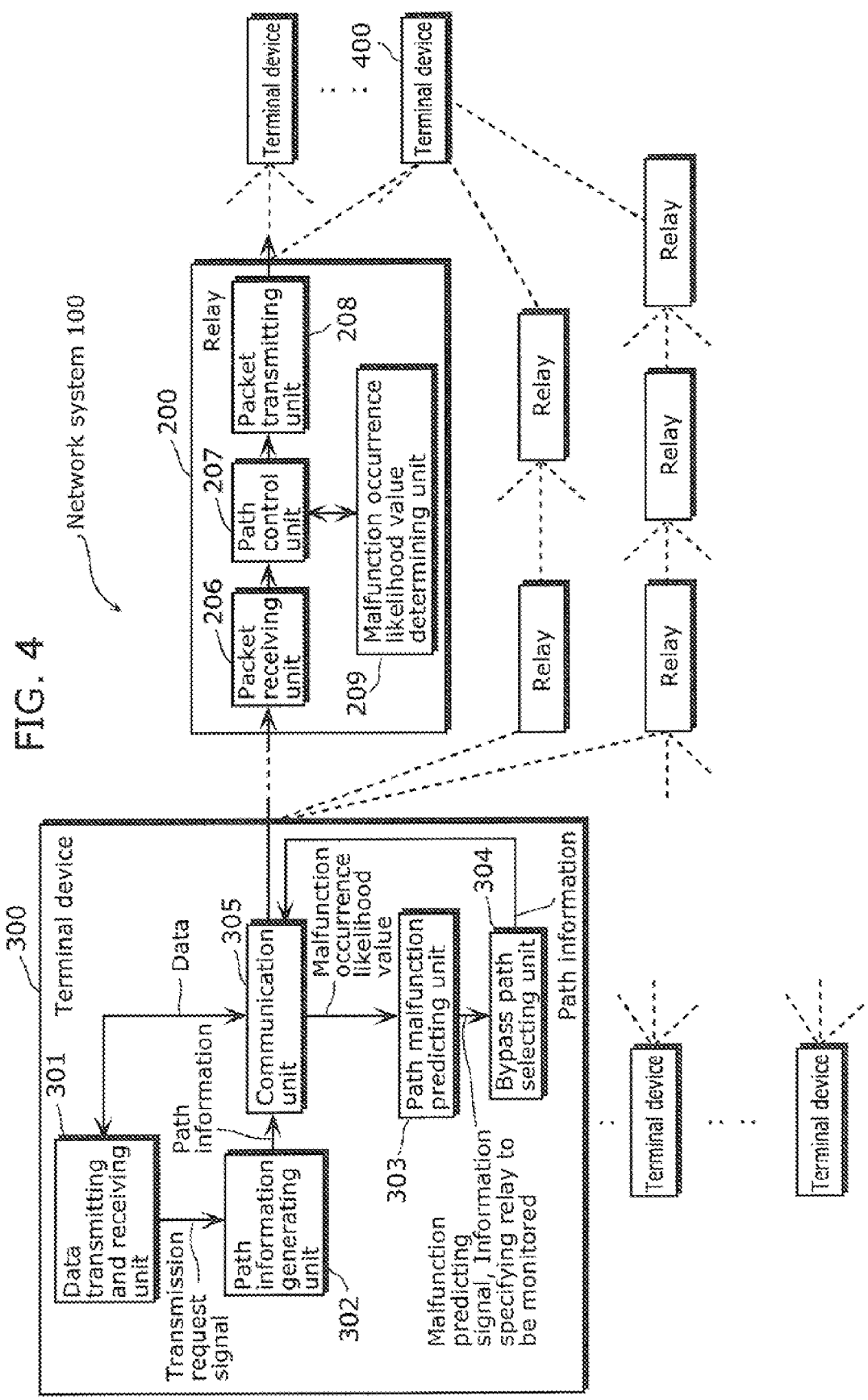
FIG. 4 illustrates an exemplary configuration of the network system according to the embodiment of the present invention.

FIG. 4 illustrates an exemplary configuration of a network system 100 according to the embodiment of the present invention including a terminal device 300 as a path control device according to the embodiment.

As illustrated in FIG. 4, the network system 100 according to the embodiment is an ad hoc network made of terminal devices including terminal devices 300, terminal devices 400, and relays 200, which are connected by communication line each other. The terminal device 300 and the terminal device 400 correspond to the transmission terminal and the reception terminal, respectively. Here, each of the communication line may be wired or wireless. In addition, part of or all of the terminal devices may function as relay.

When the network system 100 is considered as a general communication network system, the terminal device 300 corresponds to a device such as a camera, mobile phone, television, car navigation system, and personal computer, and the relay 200 corresponds to a device such as a router and switch.

In FIG. 4, the relay 200 includes a packet receiving unit 206 which receives packets, a path control unit 207 which determines a transfer destination of the received packets, a packet transmitting unit 208 which transmits the packet to the determined transfer destination, and a malfunction occurrence likelihood value determining unit 209 which determines one of, or both of the intersecting flow count and the transmission bandgap count as the Malfunction occurrence likelihood value.

The terminal device 300 includes a data transmitting and receiving unit 301 which transmits and receives data, a path information generating unit 302 which generates path information indicating a main path and a bypass path, a path malfunction predicting unit 303 which predicts the malfunction on the relay using the malfunction occurrence likelihood value (at least one of or both of the intersecting flow count and the transmission bandgap count) collected from the relay 200, a bypass path selecting unit 304 which selects one bypass path as a new main path when an malfunction of the relay on the main path is predicted, and a communication unit 305 which controls communication.

The following briefly describes the overview of the operations by the relay 200 and the terminal device 300 including details regarding conventional technology, and describes the characteristic operation of the relay 200 and the characteristic configuration and the operation of the terminal device 300 in detail.

(Overview of Operation by Relay)

The following describes the overview of the operations by the relay 200.

Figure 5:
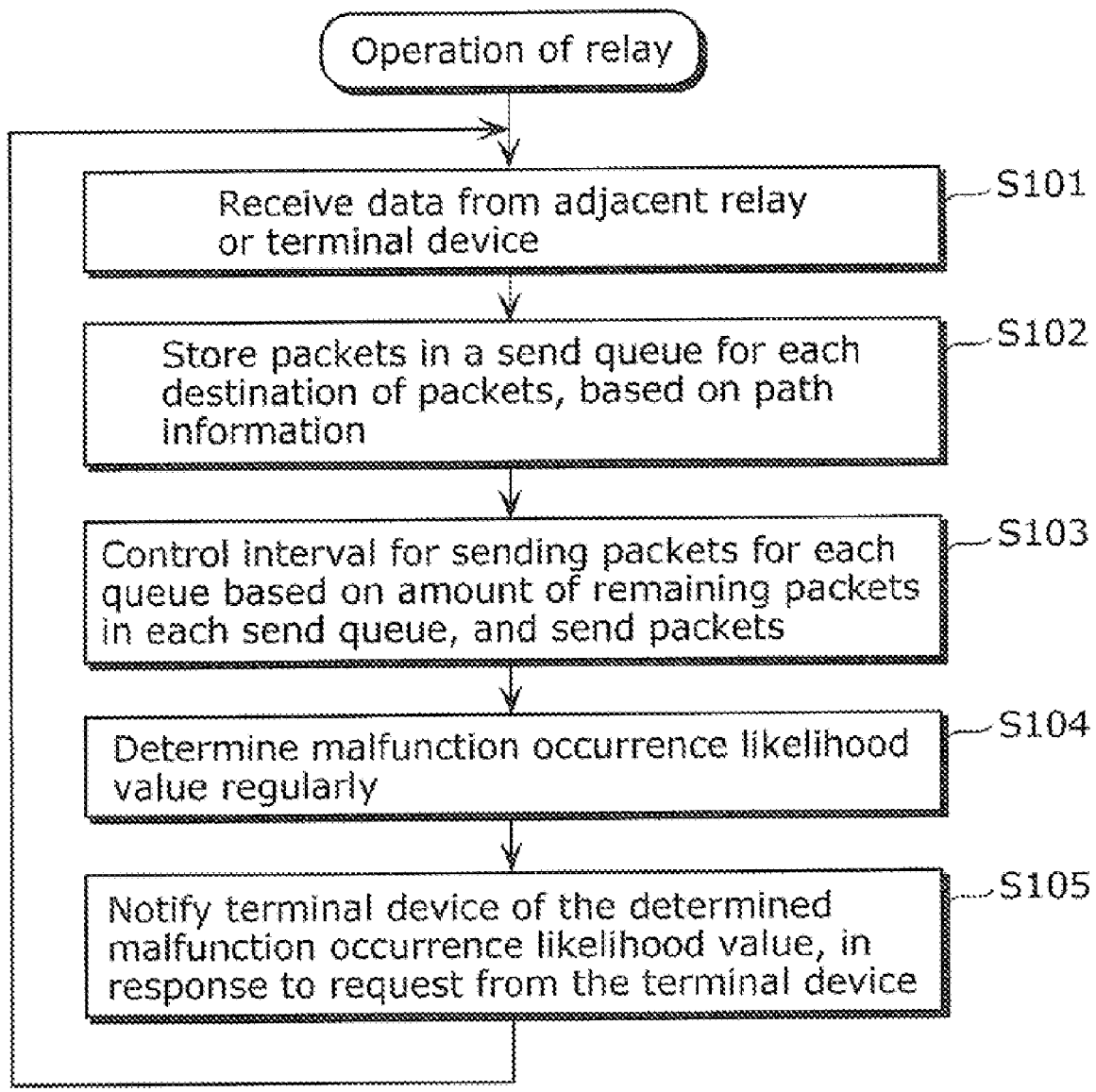
FIG. 5 is a flowchart illustrating an exemplary operation of relay.

FIG. 5 is a flowchart illustrating an exemplary operation of the relay 200.

The packet receiving unit 206 receives data from the relay or the terminal device connected by the communication line (S101).

The path control unit 207 stores packets in a send queue for each destination of the packets, based on the path information managed by the path control unit 207 (S102).

The packet transmitting unit 208 controls the interval for each send queue based on the amount of remaining packets in each send queue, and sends packets (S103).

The malfunction occurrence likelihood value determining unit 209 determines a newest value of one of or both of the intersecting flow count and the transmission bandgap count as the malfunction occurrence likelihood value, based on a process which is to be described later (S104).

The malfunction occurrence likelihood value determining unit 209 notifies the terminal device 300 of the determined malfunction occurrence likelihood value, in response to the request from the terminal device 300 (S105).

(Overview of Operations of Terminal Device)

The following describes the overview of the operations by the terminal device 300.

Figure 6:
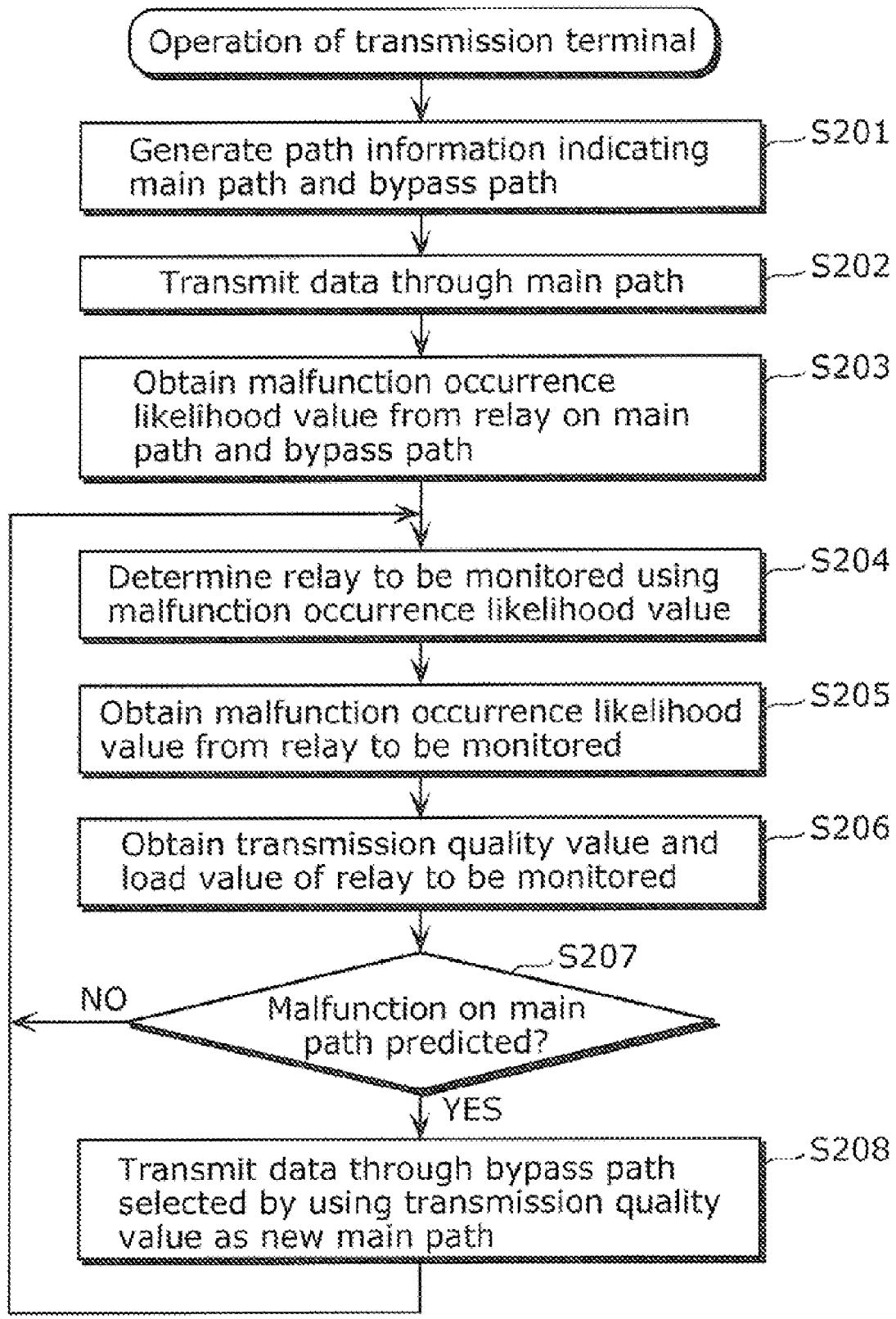
FIG. 6 is a flowchart illustrating an exemplary operation of terminal device.

FIG. 6 is a flowchart illustrating an exemplary operation of the terminal device 300.

The path information generating unit 302 generates path information indicating the main path and the bypass path, and notifies the relay 200 on the main of the path information indicating the main path (S201).

The data transmitting and receiving unit 301 transmits data including various types of information such as text, video, and audio, through the main path (S202).

The communication unit 305 collects the malfunction occurrence likelihood value, which is determined by the malfunction occurrence likelihood value determining unit 209 on each relay 200, from each relay 200 on the main path and the bypass path (S203).

The path malfunction predicting unit 303 determines a monitoring frequency value for more frequently selecting, as the relay to be monitored, the relay in which malfunction is more likely to occur, according to the malfunction occurrence likelihood value collected from each relay 200, and selects the relay to be monitored using the determined monitoring frequency value (S204).

The path malfunction predicting unit 303 collects, through the communication unit 305, the newest malfunction occurrence likelihood value from the relay selected as the relay to be monitored (S205).

The configuration and process for selecting and monitoring the relay by the path malfunction predicting unit 303 shall be described later in detail.

For the relay 200 selected as the relay to be monitored, the bypass path selecting unit 304 obtains a transmission quality value which indicates the transmission quality and the load value which indicates the amount of load (S206).

The path malfunction predicting unit 303 predicts the malfunction of the relay using the collected malfunction occurrence likelihood value (S207). For example, when a malfunction occurrence likelihood value exceeding a predetermined upper limit for good evaluation is obtained from the relay 200 on the main path, the path malfunction predicting unit 303 notifies the bypass path selecting unit 304 of the prediction of malfunction of the relay on the main path (YES in S207).

When the notification is received, the bypass path selecting unit 304 selects a bypass path which does not include a relay with the transmission quality represented by the determined transmission quality value less than the predetermined standard (typically, the best bypass path with the best transmission quality indicated by the determined transmission quality value) as a new main path. Subsequently, the bypass path selecting unit 304 transmits data through the new main path by notifying the relay 200 on the new main path of the path information indicating the new main path (S208).

The bypass path selection by the bypass path selecting unit 304 shall be described later in detail.

(Details of Determining Intersecting Flow Count and Transmission Bandgap Count)

The following specifically describes the determining of the intersecting flow count and the transmission bandgap count by the malfunction occurrence likelihood value determining unit 209.

First, a case where the malfunction occurrence likelihood value determining unit 209 determines the intersecting flow count and the malfunction occurrence likelihood value determining unit 209 notifies the terminal device 300 of the determined intersecting flow count as the malfunction occurrence likelihood value shall be described.

Figures 7A, 7B:
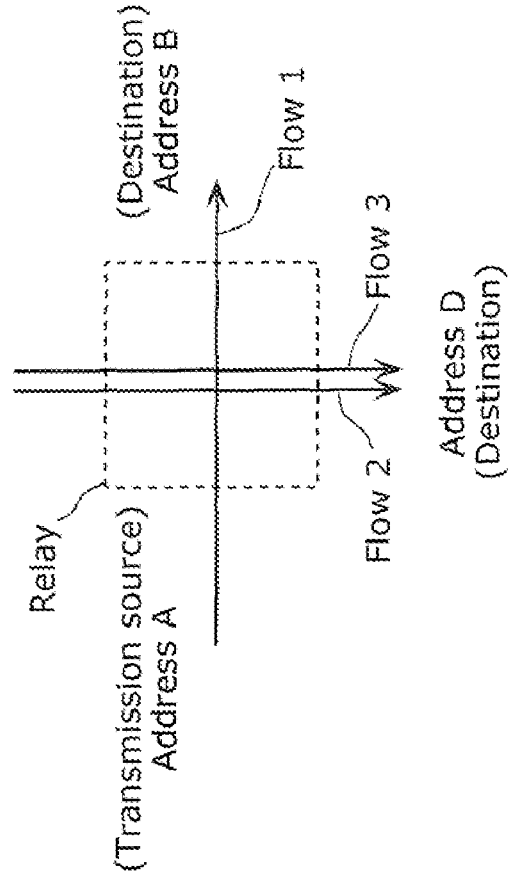
FIG. 7A illustrates an exemplary flow relayed by the relay.
FIG. 7B illustrates an example of the flow information table.

FIG. 7A illustrates an example of the flow relayed by the relay 200. The example in FIG. 7A illustrates a flow 1 which is a focused flow transmitted on the main path (a sequence of packets from an address A to an address B) and two flows intersecting the flow 1, that is, a flow 2 and a flow 3 (sequences of packets from the address C to the address D).

FIG. 7B illustrates an example of the flow information table set on the malfunction occurrence likelihood value determining unit 209. The flow information table records the flow information for each flow relayed by the relay 200. The flow information includes an identification number for identifying the flow, an IP address of the transmission source, the port number of the transmission source, the IP address of the destination, the port number of the destination of the packets constituting the flow, and the update time which is a last time when the flow is checked.

The contents of the flow information table illustrated in FIG. 7B corresponds to FIG. 7A. For example, for the flow 1, the flow information indicating that the identification number is 1, the address of the transmission source is A, the port number of the transmission source is 1000, the address of the destination is B, the port number of destination is 2000, and the updating time is T1.

FIG. 8 is a flowchart illustrating an example of determining intersecting flow count performed by the malfunction occurrence likelihood value determining unit 209. The intersecting flow count is determined each time the relay 200 relays one packet, for example.

The path control unit 207 extracts the IP address of the transmission source and the IP address of the destination from the IP header of the packet, and extracts the port number of the transmission source and the port number of the destination from the TCP header or the UDP header of the packet by analyzing the packet to be relayed (S301).

The malfunction occurrence likelihood value determining unit 209 searches for the flow information which has values matching the extracted values of the IP address of the transmission source, the IP address of the destination, the port number of the transmission source, and the port number of the destination, from the flow information table. If the flow information is present on the flow information table, the update time of the flow information on the flow information table is changed to the current time. If the flow information is not present on the flow information table, the update time is generated as the current time, and the flow information is added to the flow information table (S302).

The flow information that is indicated as not updated for a predetermined period by the comparison between the update time and the current time is removed from the flow information table (S303).

The malfunction occurrence likelihood value determining unit 209 notifies the terminal device 300 of the intersecting flow count, which is a number obtained by subtracting one from the number of flow information recorded on the flow information table, when the terminal device 300 inquires the malfunction occurrence likelihood value (S304).

Next, a case where the malfunction occurrence likelihood value determining unit 209 determines the transmission bandgap count, and notifies the terminal device 300 of the determined transmission bandgap count as the malfunction occurrence likelihood value shall be described.

FIG. 9A illustrates an example of transmission bandgap in the relay 200. FIG. 9A illustrates an example including a flow 1 which is a focused flow transmitted on the main path (a sequence of packets from an address A to an address B) and two flows intersecting the flow 1, that is, a flow 2 and a flow 3 (sequences of packets from the address C to the address D).

On the flow 1, the transmission band 5 Mbps on the transmission side is narrower than the transmission band 10 Mbps on the reception side. On the flows 2 and 3, the transmission band 8 Mbps on the transmission side is narrower than the transmission band 10 Mbps on the reception side. In other words, all of the flow 1, flow 2, flow 3 have the transmission bandgap in the example in FIG. 9A.

Here, it is assumed that the information indicating the transmission band on the reception side and the information indicating the transmission band on the transmission side for each flow are recorded on the packet receiving unit 206 and the packet transmitting unit 208, respectively.

FIG. 9B illustrates an example of the flow information table managed by the malfunction occurrence likelihood value determining unit 209. The flow information table records the flow information which includes, for each flow with the transmission bandgap in the relay 200, an identification number for identifying the flow, an IP address of the transmission source, the port number of the transmission source, the IP address of the destination, the port number of the destination of the packets constituting the flow, and the update time.

The contents of the flow information table illustrated in FIG. 9B corresponds to FIG. 9A. For example, for the flow with the identification number 1 and with the transmission bandgap, the flow information indicating that the address of the transmission source is A, the port number of the transmission source is 1000, the address of the destination is B, the port number of destination is 2000, and the update time (last time when the flow information is checked) is T1.

FIG. 10 is a flowchart illustrating an example of transmission bandgap count determining performed by the malfunction occurrence likelihood value determining unit 209. The transmission bandgap count is determined each time the relay 200 relays one packet, for example.

In the same manner as the above-described step S301, the path control unit 207 extracts the IP address of the transmission source, the IP address of the destination, the port number of the transmission source, and the port number of the destination (S401).

The malfunction occurrence likelihood value determining unit 209 obtains the information indicating the transmission band on the reception side of the flow to be relayed and the information indicating the transmission band on the transmission side of the flow to be relayed from the packet receiving unit 206 and the packet transmitting unit 208, respectively.

When the obtained information indicates that the flow to be relayed has the transmission bandgap, the flow information regarding the flow to be relayed is added to the flow information table, or the update time of the flow information is changed in the same manner as the step S302 (S402).

The flow information that is indicated by the comparison between the update time and the current time as not updated for a predetermined period is removed from the flow information table (S403).

The malfunction occurrence likelihood value determining unit 209 notifies the terminal device 300 of the transmission bandgap count, which is the number of flow information recorded on the flow information table as the malfunction occurrence likelihood value, when the terminal device 300 inquires the malfunction occurrence likelihood value (S404).

(Details of Configuration of Path Malfunction Predicting Unit)

The following describes the configuration of the path malfunction predicting unit 303 in detail.

Figure 11:
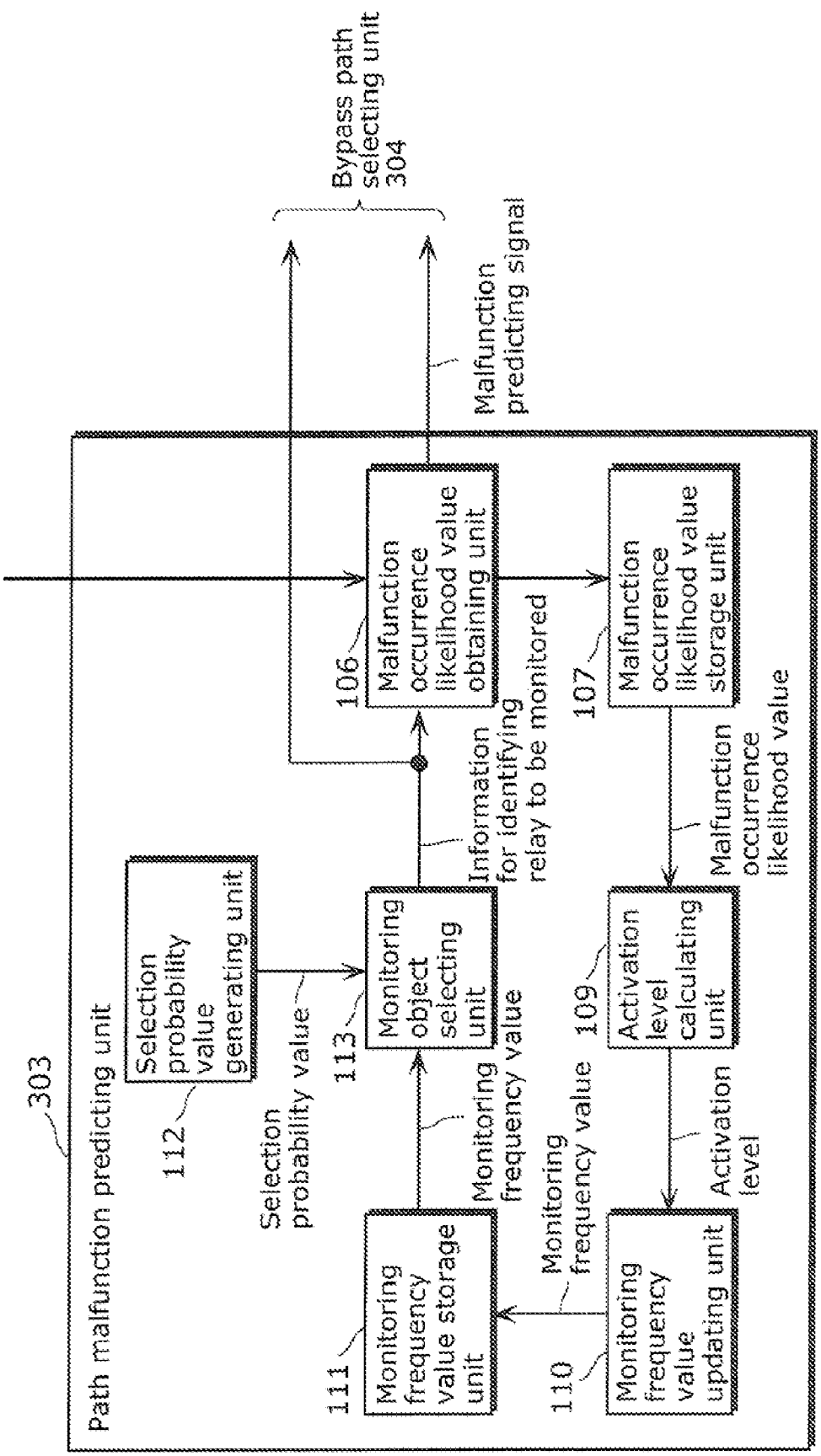
FIG. 11 is a block diagram illustrating an example of the functional configuration of the path malfunction predicting unit.

FIG. 11 is a block diagram illustrating an example of the functional configuration of the path malfunction estimating unit 303.

The path malfunction predicting unit 303 includes a malfunction occurrence likelihood value obtaining unit 106, a malfunction occurrence likelihood value storage unit 107, an activation level calculating unit 109, a monitoring frequency value updating unit 110, a monitoring frequency value storage unit 111, a selection probability value generating unit 112, and a monitoring object selecting unit 113.

The malfunction occurrence likelihood value obtaining unit 106 obtains the malfunction occurrence likelihood value (the intersecting flow count and the transmission bandgap count) from the relay selected by the monitoring object selecting unit 113 as the relay to be monitored.

The malfunction occurrence likelihood value is obtained by issuing inquiring packet to the relay to be monitored. The malfunction occurrence likelihood value may be collected periodically (for example, at a time when the current time matches or passes the estimated measurement time), or may be performed according to another time schedule.

When the malfunction occurrence likelihood value is obtained from the relay on the main path, the malfunction occurrence likelihood value obtaining unit 106 determines that the malfunction is likely to occur on the main path if the malfunction occurrence likelihood value exceeds a predetermined upper limit for good evaluation, notifies the bypass path selecting unit 304 that the malfunction on the main path is predicted.

The malfunction occurrence likelihood value storage unit 107 stores, for each relay, the malfunction occurrence likelihood value obtained by the malfunction occurrence likelihood value obtaining unit 106.

The activation level calculating unit 109 calculates an activation level that indicates a tendency where the larger the malfunction occurrence likelihood value of the relay, the higher the monitoring frequency value, from the malfunction occurrence likelihood value of each relay stored in the malfunction occurrence likelihood value storage unit 107 and the monitoring frequency of each relay stored in the monitoring frequency value storage unit 111.

The monitoring frequency value updating unit 110 calculates a new monitoring frequency value for each relay based on the calculated activation level, and updates the monitoring frequency value stored by the monitoring frequency value storage unit 111 into a new monitoring frequency.

The monitoring object selecting unit 113 stochastically selects the relay to be monitored by adding the selection probability value generated by the selection probability value generating unit 112 to the monitoring frequency of each relay stored in the monitoring frequency value storage unit 111.

The relay selected to be monitored is a relay for obtaining the malfunction occurrence likelihood value by the malfunction occurrence likelihood value obtaining unit 106 next time, and to be notified of the bypass path selecting unit 304, and is an object for determining the transmission quality value and the load value by the bypass path selecting unit 304.

Repeatedly performing the series of process allows weighting the frequency of monitoring the relay according to the likelihood of the malfunction and thoroughly monitoring all of relays at the same time.

(Detail of Relay Selection and Monitoring by Path Malfunction Predicting Unit)

The following further describes selection and monitoring of the relay by the path malfunction predicting unit 303 configured as described above in detail.

First, the concept of monitoring accuracy of each relay shall be described. Note that, the monitoring accuracy here refers to the validity of the monitoring frequency.

Figure 12:
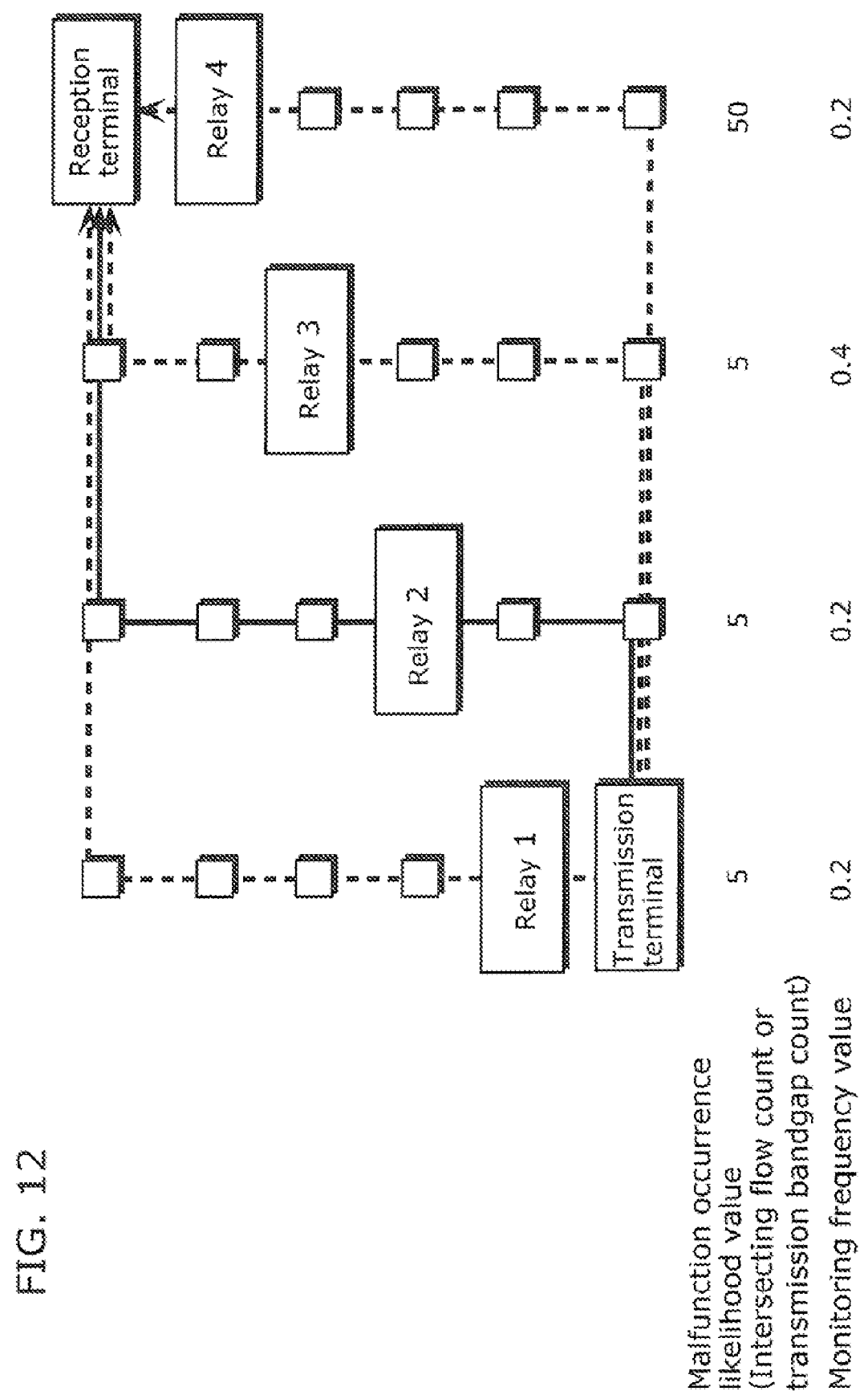
FIG. 12 illustrates examples of the monitoring frequency value and the malfunction occurrence likelihood value of each relay.
Figure 13:
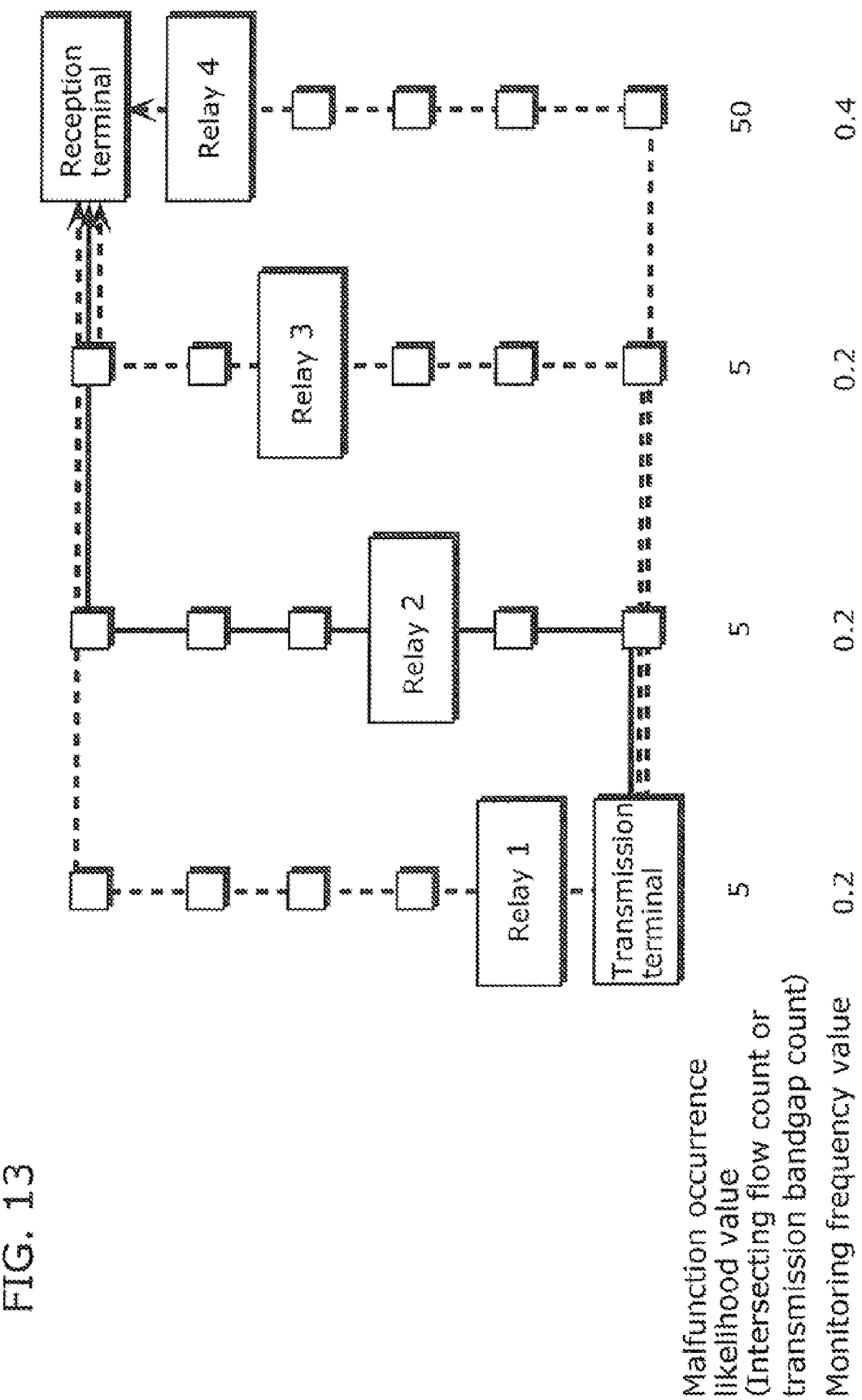
FIG. 13 illustrates an example of the monitoring frequency value and the malfunction occurrence likelihood value of each relay.

FIGS. 12 and 13 illustrate examples of the monitoring frequency value and the malfunction occurrence likelihood value of each relay. The examples in FIGS. 12 and 13 illustrate a main path indicated in solid line and three bypass paths indicated in dashed lines as transmission paths from the transmission terminal to the reception terminal. Furthermore, one relay in each of the main path and the bypass paths is determined as a candidate for monitoring. A relay to be monitored is stochastically selected from the four relays that are candidates for monitoring. The malfunction occurrence likelihood value and the transmission quality value are obtained from the selected relay.

The malfunction occurrence likelihood value here refers to the intersecting flow count and the transmission bandgap count. The malfunction occurrence likelihood value 50 of the relay 4 is 10 times higher than the malfunction occurrence likelihood value 5 of the relays 1 to 3. This indicates that the malfunction is more likely to occur in the relay 4 than on the relays 1 to 3.

Furthermore, the monitoring frequency value indicates the frequency of selecting each relay as the relay to be monitored. For example, the monitoring frequency value 0.2 of the relay 1 indicates that the relay 1 is monitored for 20% of all monitoring operations.

It is reasonable to monitor the relay with higher likelihood of malfunction at higher frequency for accurately predicting the malfunction in the limited number of monitoring operations.

However, in the example in FIG. 12, the relay to be highly-frequently monitored is the relay 3. The relay 4 which is considered to have high likelihood of malfunction is given the same monitoring frequency value as the other relays 1 and 2 which are considered to have low likelihood of malfunction.

As described above, when the tendency that the relay with higher malfunction occurrence likelihood value has higher monitoring frequency is small, the status is defined as low monitoring accuracy.

On the other hand, in the example in FIG. 13, the highest monitoring frequency value is of the relay 4 with higher malfunction occurrence likelihood value than those of the other relays, and the monitoring frequency values of the other three relays are low.

As described above, when the tendency that the relay with higher malfunction occurrence likelihood value has higher monitoring frequency is large, it is defined as high monitoring accuracy.

(Malfunction Occurrence Likelihood Value Storage Unit 107)

The malfunction occurrence likelihood value storage unit 107 stores the malfunction occurrence likelihood value obtained by the malfunction occurrence likelihood value obtaining unit 106, using the malfunction occurrence likelihood value table.

FIG. 14 illustrates exemplary data structure of the malfunction occurrence likelihood value table.

The malfunction occurrence likelihood value table records the identification numbers of relays in the first column, the IP addresses of the relays in the second column, and the malfunction occurrence likelihood values (the intersecting flow count or the transmission bandgap count) obtained from the relays in the third column.

(Monitoring Frequency Value Storage Unit 111)

The monitoring frequency value storage unit 111 stores the monitoring frequency values of each relay using the monitoring frequency value table.

FIG. 15 illustrates an example of data structure of the monitoring frequency value table.

The monitoring frequency value table records the identification numbers of relays in the first column, the IP addresses of the relays in the second column, and the monitoring frequency values of the relays in the third column.

(Activation Level Calculating Unit 109)

The activation level calculating unit 109 calculates the activation level α which indicates the level of the monitoring accuracy. The activation level α is a quantified index of the level of tendency that the relay with higher likelihood of malfunction is monitored at higher frequency. More specifically, the activation level α refers to the level of correlation between the malfunction occurrence likelihood value and the monitoring frequency value.

Figure 16:
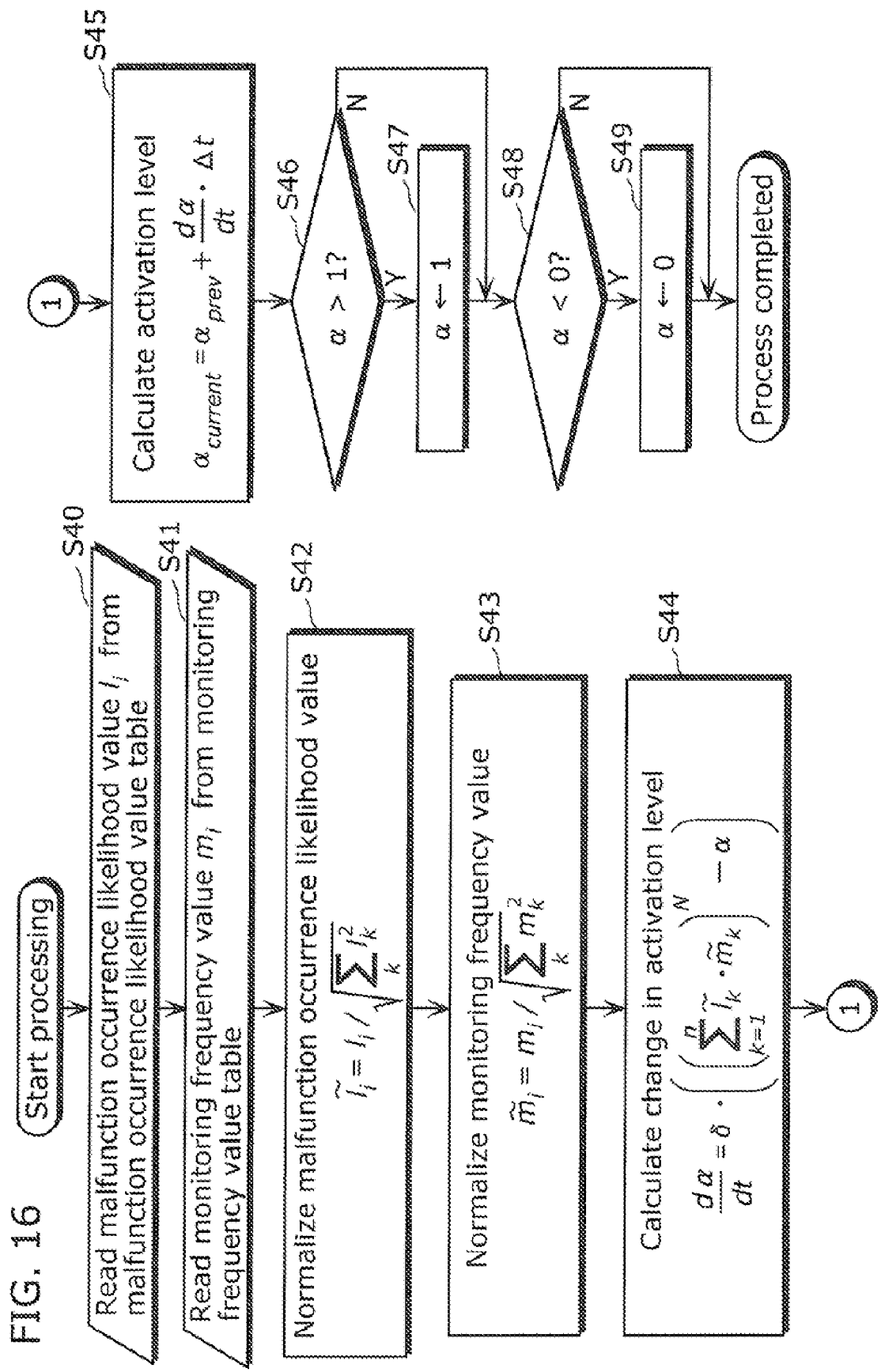
FIG. 16 is a flowchart illustrating an example of process performed by an activation level calculating unit.

FIG. 16 is a flowchart illustrating an example of process performed by an activation level calculating unit 109.

The activation level calculating unit 109 reads the malfunction occurrence likelihood value $I_i$ of each relay from the malfunction occurrence likelihood value table (S40), reads the monitoring frequency value $m_i$ of the relay from the monitoring frequency value table in the monitoring frequency value storage unit 111 (S41), and calculates the change in the activation level α according to Equation 1, using the read malfunction occurrence likelihood value and the monitoring frequency value (S42 to S44).

[Equation 1]

$$\frac{d\alpha}{dt} = \delta \cdot \left( \left( \sum_{k=1}^{n} \tilde{l}_k \cdot \tilde{m}_k \right)^N - \alpha \right) \quad \text{(Equation 1)}$$

Equation is an example of the definition of the dynamics of the activation level α, where n denotes the number of relays that are candidates for monitoring, $I_i$ denotes the malfunction occurrence likelihood value of the relay i recorded on the malfunction occurrence likelihood value table, $m_i$ denotes the monitoring frequency value of the relay, and N, δ denote the constants for controlling the rates of change of the dynamics. The term of the product-sum operation of the malfunction occurrence likelihood value and the monitoring frequency value indicates the level of correlation between the malfunction occurrence likelihood value and the monitoring frequency value.

The tildes on $I_i$ and $m_i$ indicate that the values are normalized, that is, in the relationship shown in Equations 2 and 3, respectively.

[Equation 2]

$$\tilde{l}_i = l_i \bigg/ \sqrt{\sum_k l_k^2} \quad \text{(Equation 2)}$$

[Equation 3]

$$\tilde{m}_i = m_i \bigg/ \sqrt{\sum_k m_k^2} \quad \text{(Equation 3)}$$

The activation level α is updated according to Equation 4, using the change in the activation level α calculated by Equation 1 (S45). Here, Δt denotes a time interval determined by the updating cycle.

[Equation 4]

$$\alpha_{current} = \alpha_{prev} + \frac{d\alpha}{dt} \cdot \Delta t \quad \text{(Equation 4)}$$

The variance range of the activation level α is restricted to a closed interval between 0 and 1, for ease of handling (S46 to S49). Thus, the activation level α is restricted to a real number between 0 and 1 inclusive.

The activation level α close to 0 corresponds to low monitoring accuracy, while the activation level α close to 1 corresponds to high monitoring accuracy. This is because, according to the dynamics of Equation 4, the activation level α becomes close to 1 as the monitoring frequency value of the relay comes close to the preferable status considering the malfunction occurrence likelihood value, and becomes close to 0 as the monitoring frequency value of the relay deviates from the malfunction occurrence likelihood value.

(Monitoring Frequency Value Updating Unit 110)

The monitoring frequency value updating unit 110 calculates a new monitoring frequency $m_i$ for the relays which are candidates for monitoring, based on the value of the activation level α determined by the activation level calculating unit 109.

Figure 17:
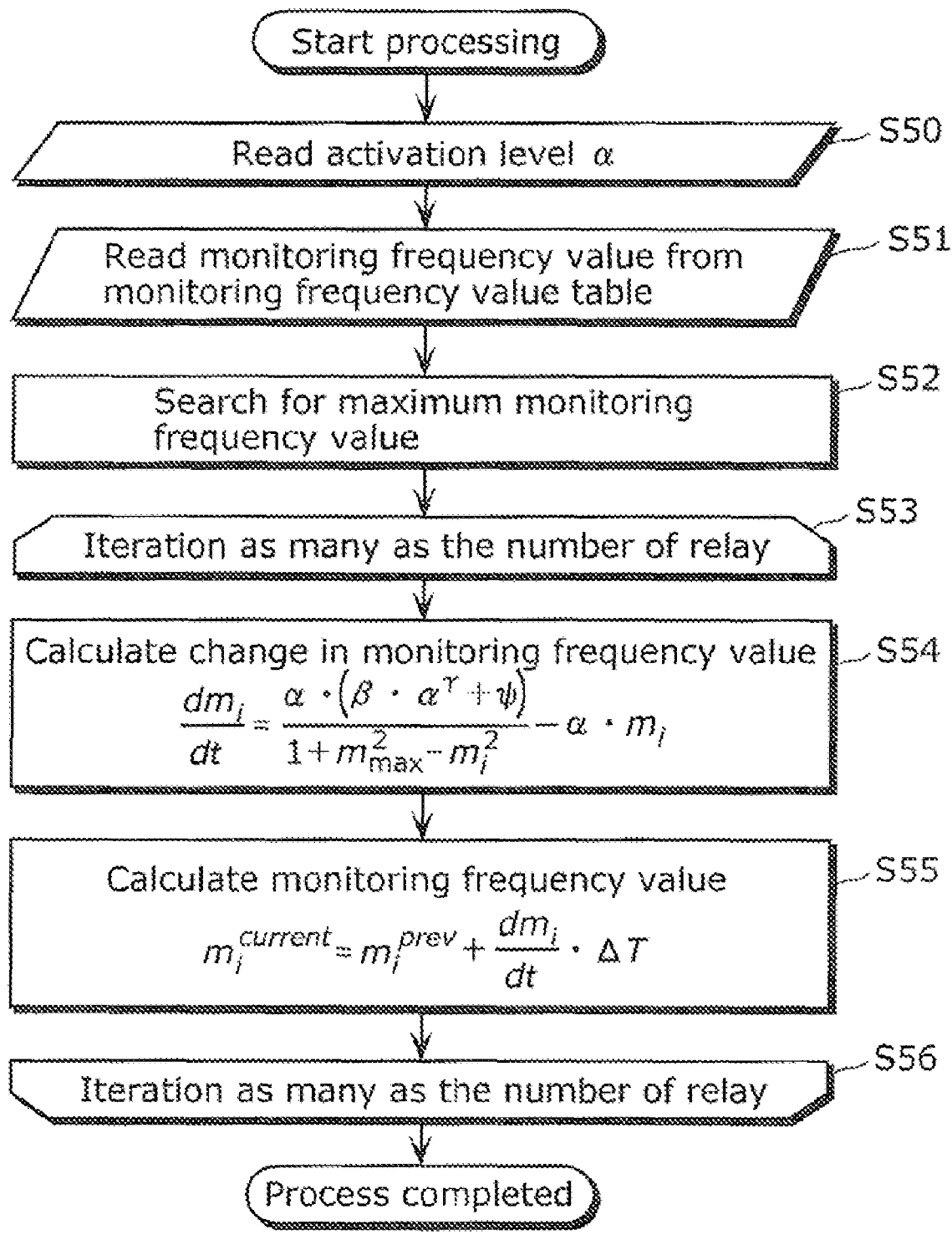
FIG. 17 is a flowchart illustrating an example of the process performed by a monitoring frequency value updating unit.

FIG. 17 is a flowchart illustrating an example of process performed by an activation level updating unit 110.

The monitoring frequency value updating unit 110 reads the activation level α determined by the activation level calculating unit 109 (S50), reads the monitoring frequency value $m_i$ from the monitoring frequency value table in the monitoring frequency value storage unit 111 (S51), and searches for the maximum value $m_{max}$ of the monitoring frequency value (S52). The new monitoring frequency value for each relay is calculated using the activation level a that is read, the monitoring frequency value $m_i$, and the maximum monitoring frequency value $m_{max}$ (S53 to S56).

The following further describes the calculation of the monitoring frequency value.

Equation 5 is an example of the definition of the dynamics of the monitoring frequency value $m_i$. $\beta$, $\gamma$, and $\varphi$ in the equation are constants for controlling the rate of change of the dynamics.

[Equation 5]

$$\frac{dm_i}{dt} = \frac{\alpha \cdot (\beta \cdot \alpha^\gamma + \varphi)}{1 + m_{max}^2 - m_i^2} - \alpha \cdot m_i \quad \text{(Equation 5)}$$

It is known that the steady-state solution of the nonlinear ordinary differential equation for the relay with the maximum updating frequency value is Equation 6

[Equation 6]

$$m_i = \beta \cdot \alpha^\gamma + \varphi \quad \text{(Equation 6)}$$

Furthermore, the steady-state solution for the other relays is Equation 7.

[Equation 7]

$$m_i = \frac{1}{2}\left[\sqrt{4(\beta \cdot \alpha^\gamma + \varphi)^2} - (\beta - \alpha^\gamma + \varphi)\right] \quad \text{(Equation 7)}$$

The change in the monitoring frequency value $m_i$ is calculated according to Equation 5, and the monitoring frequency value is updated according to Equation 8, using the change in the calculated change in monitoring frequency value $m_i$. Here, $\Delta t$ denotes a time interval determined by the updating cycle.

[Equation 8]

$$m_i^{current} = m_i^{prev} + \frac{dm_i}{dt} \cdot \Delta T \quad \text{(Equation 8)}$$

The monitoring frequency value updating unit 110 updates the monitoring frequency value recorded on the monitoring frequency value table with the new monitoring frequency value $m_i$ calculated for each relay that is the candidate for monitoring.

(Selection Probability Value Generating Unit 112)

The selection probability value generating unit 112 generates the selection probability value which is random numbers used for stochastically selecting the relay to be monitored by the monitoring object selecting unit 113. Although it is preferable that the selection probability values are random numbers, they may be substituted by pseudorandom numbers which can be generated relatively easily. The probability distribution used in that case may be a general uniform distribution or Gaussian distribution.

The variation range of the selection probability value can be determined using Equation 6 or Equation 7. When the activation level $\alpha$ is 0, the distance D between the solutions is represented by Equation 9.

[Equation 9]

$$D = 0.5 \cdot (1 - \sqrt{\varphi^2 + 4}) \quad \text{(Equation 9)}$$

With this, the selection probability value $\eta_i$ is determined as shown in Equation 10.

[Equation 10]

$$\eta_i = \text{Random}(i)[-0.25 \cdot (\kappa + 1 - \sqrt{\varphi^2 + 4}), +0.25 \cdot (\kappa + 1 - \sqrt{\varphi^2 + 4})] \quad \text{(Equation 10)}$$

Random function generates actual random numbers or pseudorandom numbers within a predetermined range, and K is the adjustment factor with the value equal to or more than 0. Increasing K expands the amplitude of the selection probability value to be generated.

(Monitoring Object Selecting Unit 113)

Figure 18:
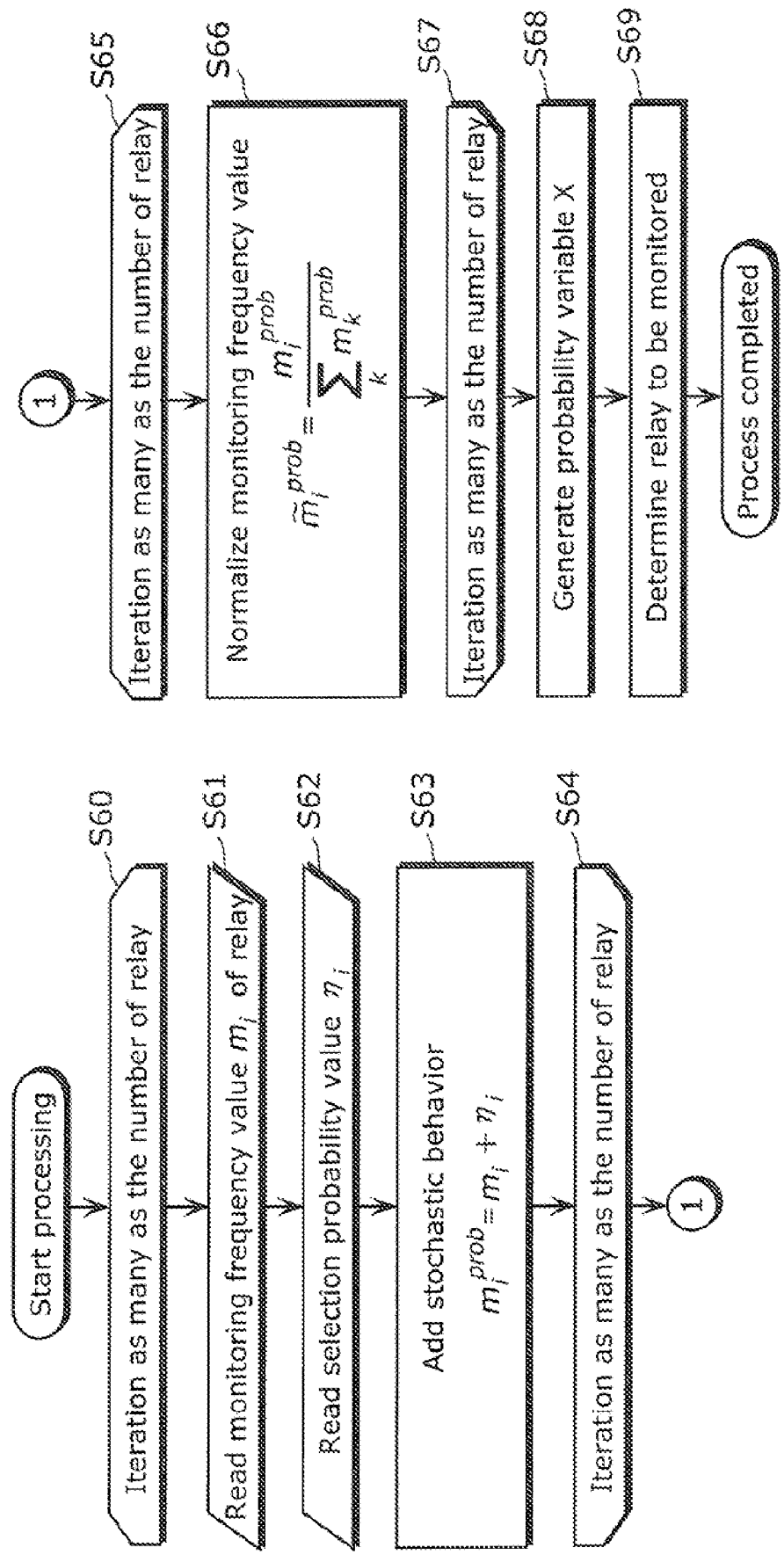
FIG. 18 is a flowchart illustrating an example of the process performed by a monitoring object selecting unit.

FIG. 18 is a flowchart illustrating an example of process performed by the monitoring object selecting unit 113.

The monitoring object selecting unit 113 reads the monitoring frequency value $m_i$ of each relay from the monitoring frequency value table managed by the monitoring frequency value storage unit 111, and stochastically selects the relay to be monitored by adding the selection probability value $\eta_i$ of the corresponding relay generated by the selection probability value generating unit 112 to the monitoring frequency $m_i$, as shown in Equation 11 (S60 to S64).

[Equation 11]

$$m_i^{prob} = m_i + \eta i \quad \text{(Equation 11)}$$

The monitoring frequency of each relay that is updated is normalized using Equation 12 to derive a probability value.

[Equation 12]

$$\tilde{m}_i^{prob} = \frac{m_i^{prob}}{\sum_k m_k^{prob}} \quad \text{(Equation 12)}$$

FIG. 19 illustrates an example of data structure of the normalized monitoring frequency value table that records the normalized monitoring frequency value operated as described above.

The normalized monitoring frequency value table records the identification numbers of the relays in the first column, the IP addresses of the relays in the second column, and the normalized monitoring frequency values calculated using Equation 12 in the third column.

The monitoring object selecting unit 113 considers the index of the relay to be selected as the probability variable by seeing the normalized monitoring frequency value as the probability distribution for the index of each relay, and selects the relay to be monitored according to the value of the probability variable (S68, S69).

With the above-described operations, the selected relay is monitored according to the monitoring frequency value. Thus, compared to the case where all relays on the path are constantly monitored, the resources required for monitoring are saved, allowing effective monitoring even in a narrowband network.

In addition, malfunctions are predicted using the number of flows relayed by the relay as the malfunction occurrence likelihood value. Thus, compared to the conventional method that detects malfunction by referring to the statistic reflecting the fact that the malfunction is actually occurring, such as the number of retry, the value indicating load on the line, and the amount of traffic, it is possible to detect the malfunction early, before the malfunction reflected on the statistics actually occur.

(Detail of Bypass Path Selection)

The bypass path selection by the bypass path selecting unit 304 shall be described as follows in detail.

Figure 20:
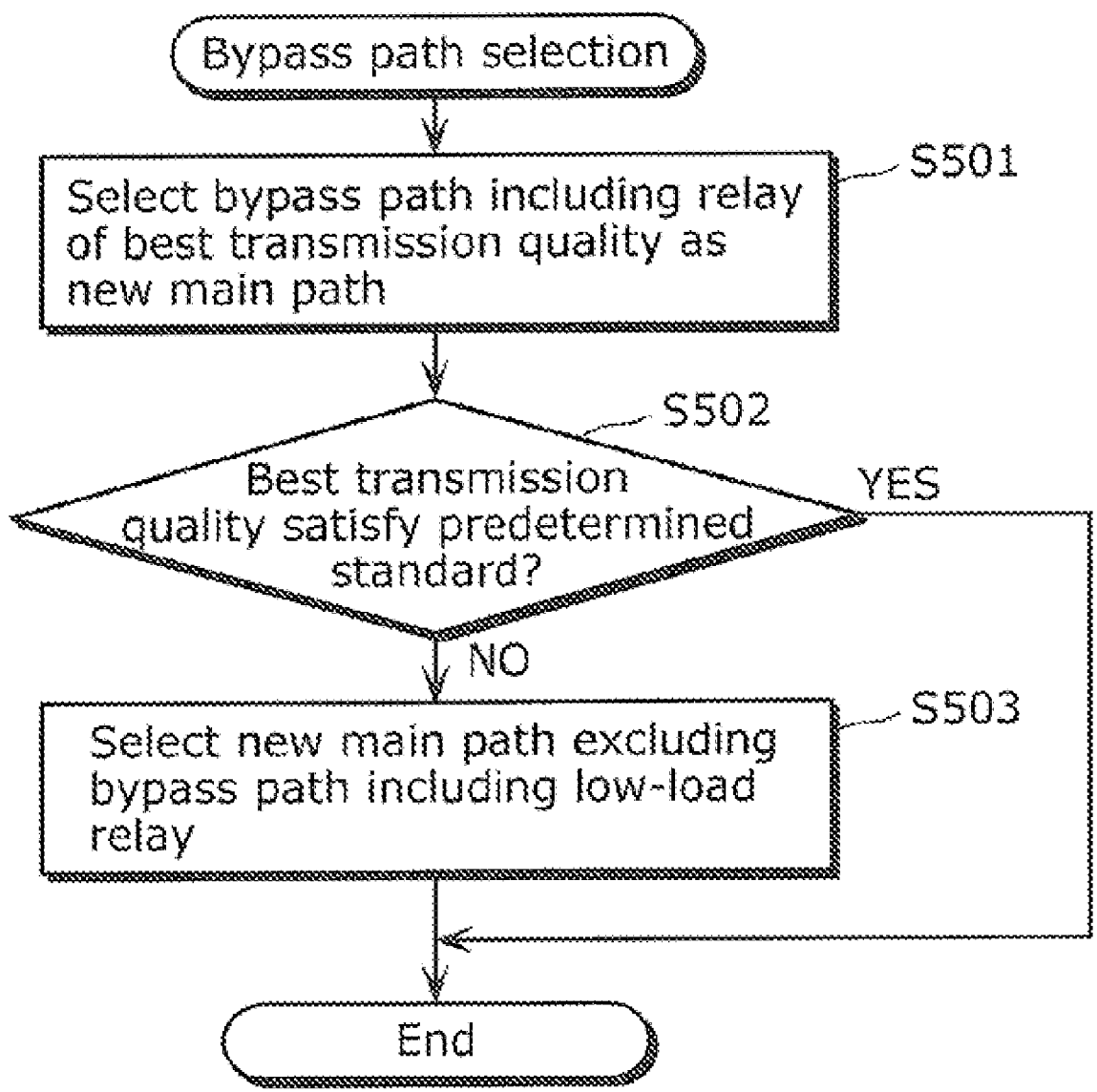
FIG. 20 is a flowchart illustrating an example of bypass path selecting process.

FIG. 20 is a flowchart illustrating an example of process performed by the bypass path selecting unit 304. This process is performed when the bypass path selection unit 304 receives a notification from the path malfunction predicting unit 303 that the malfunction on the main path is predicted.

Prior to this process, the bypass path selecting unit 304 measures the transmission quality value (for example, the loss rate, delay time, and jitter value) indicating the transmission quality of the relay selected as the relay to be monitored by the path malfunction predicting unit 303, obtains the load value (for example, buffer usage rate) indicating the level of load in the relay from the relay, and stores the transmission quality value and the load value for each relay using a table that is not illustrated.

When receiving the notification from the path malfunction predicting unit 303 indicating that the malfunction on the main path is predicted, the bypass path selecting unit 304 selects a bypass path to be a new main path, using the transmission quality values and the load values stored therein.

More specifically, the path is selected as follows.

The bypass path selecting unit 304 refers to the transmission quality value stored for the relays in each bypass paths, and selects a bypass path including a relay with the highest transmission quality indicated by the transmission quality value (for example, with the lowest loss rate) as a new main path (S501).

However, when the highest transmission quality does not satisfy the predetermined standard (for example, when the lowest loss rate is equal to or higher than the predetermined threshold) (No in S502), the bypass path selecting unit 304 refers to the load value stored for each relay, and re-selects a new main path from the bypass paths except the bypass path including the relay with low load (for example, the buffer usage rate is less than the predetermined threshold) (S503).

It is assumed that in the relay with low load despite low transmission quality, degradation of the transmission quality due to transmission error is dominant, rather than congestion. The transmission errors usually do not recover easily, compared to the congestion.

The process described above allows distinguishing congestion and transmission error, and excluding the bypass path in which the hard-to-recover transmission error is occurring from the candidates for the new main path. This allows appropriately selecting the new path, achieving highly reliable transmission.

Note that, the description above is the example in which the measurement results such as the loss rate, delay time, jitter value are used as the transmission quality value. However, instead of measuring these values, the bypass path selecting unit 304 may use the level of temporal change in the malfunction occurrence likelihood value (the intersecting flow count and transmission bandgap count) as the transmission quality value.

This is because it is assumed that in the relay in which the intersecting flow count and the transmission bandgap frequently change, the transmission quality changes greatly and as a result it would be difficult to maintain a desired transmission quality stably. The level of temporal change in the malfunction occurrence likelihood value may be represented, for example, by a variance value of the malfunction occurrence likelihood values obtained from one relay within a predetermined period, for example.

Furthermore, although the description above describes an example in which one new path is selected by the bypass path selecting unit 304 when a malfunction on the main path is predicted by the path malfunction predicting unit 303, the process that should be taken by the bypass path selecting unit 304 is not limited to this example.

For example, in a network in which multi-path transmission from the transmission terminal to the reception terminal is performed, the bypass path selecting unit 304 may assign data amount to be transmitted through each path composing the multi-path (for example, more data amount is assigned to a path with high transmission quality than the path with low transmission quality). Furthermore, data may be sorted for each path (for example, highly important data such as control signals is transmitted through the path with highest transmission quality).

Application Example

The following describes an example of the application of the path control method according to the present invention.

Figure 21:
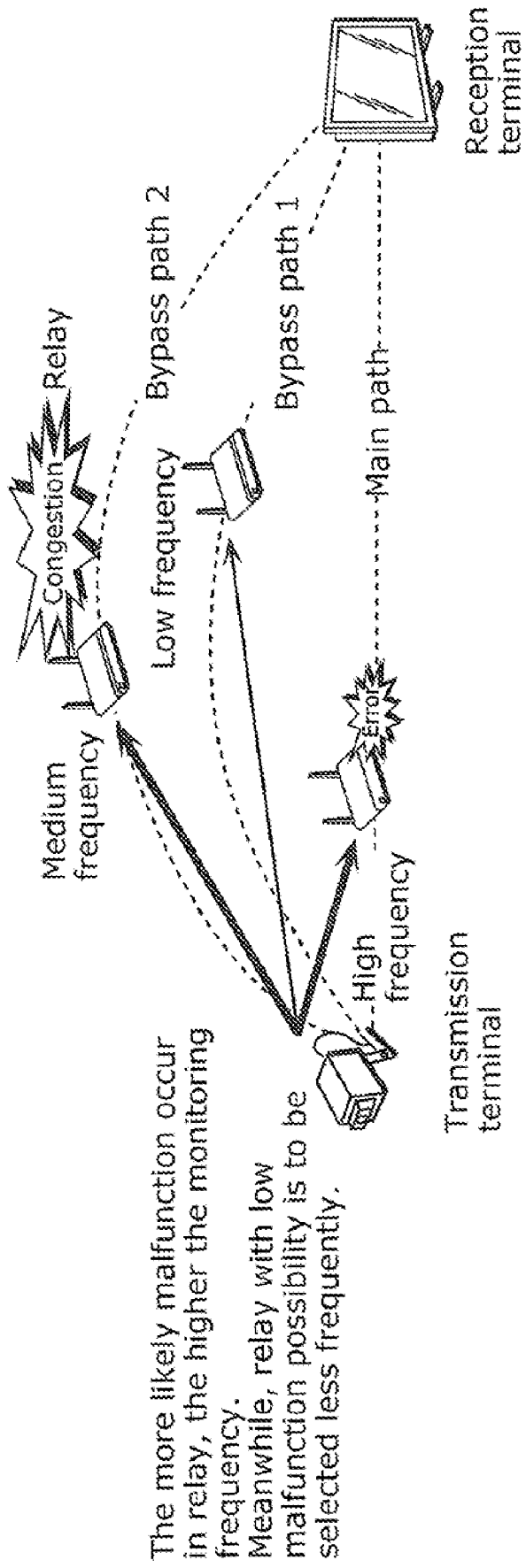
FIG. 21 is a schematic diagram illustrating an example of specific structure of the network to which the path control method according to the present invention is applied.

FIG. 21 is a schematic diagram illustrating an example of specific structure of the network to which the path control method according to the present invention is applied.

In the example in FIG. 21, one main path and two bypass paths are illustrated from the camera, the transmission terminal, and to the television, the reception terminal. In addition, one relay that is a candidate for monitoring is illustrated for each path.

In the example in FIG. 21, the relay which is indicated by the malfunction occurrence likelihood value collected from the relays that are candidates for monitoring as likely to have malfunction is selected to be the relay to be monitored highly frequently, whereas the relay indicated as less likely to have malfunctions is selected as the relay to be monitored at low frequency.

New malfunction occurrence likelihood value and the transmission quality value of the relay selected as the relay to be monitored are collected. Subsequently, attempts for preventing malfunction in advance is made by predicting malfunctions on the main path using the collected malfunction occurrence likelihood value and the transmission quality value, and by selecting a bypass path to be a new main path.

It is reasonable to monitor the relay with higher likelihood of malfunction at higher frequency for accurately predicting the malfunction in the limited number of monitoring operations through these operations.

This allows limiting the number of monitoring operations and precisely predicting malfunctions. Thus, even when the bypass path increases or when there are many relays as the candidates for monitoring, it is possible to accurately figure out the status of the relay using small amount of observation packets, and thus it is possible to contribute to lower electric consumption and reduced network load due to the observation packets.

Note that, under certain conditions, collection of the malfunction occurrence likelihood values from the relays and update of the monitoring frequency values may be stopped. For example, in the communication method in which the transmission path and the transmission band are reserved, the intersecting flow count does not change until the communication ends. Thus, collection of the malfunction occurrence likelihood values from the relays and update of the monitoring frequency values may be stopped, and the relay to be monitored may be fixed.

(Variation of Path Control According to the Size of Malfunction)

The following describes a variation in which path control is performed according to the size of malfunction in the network.

Figure 22:
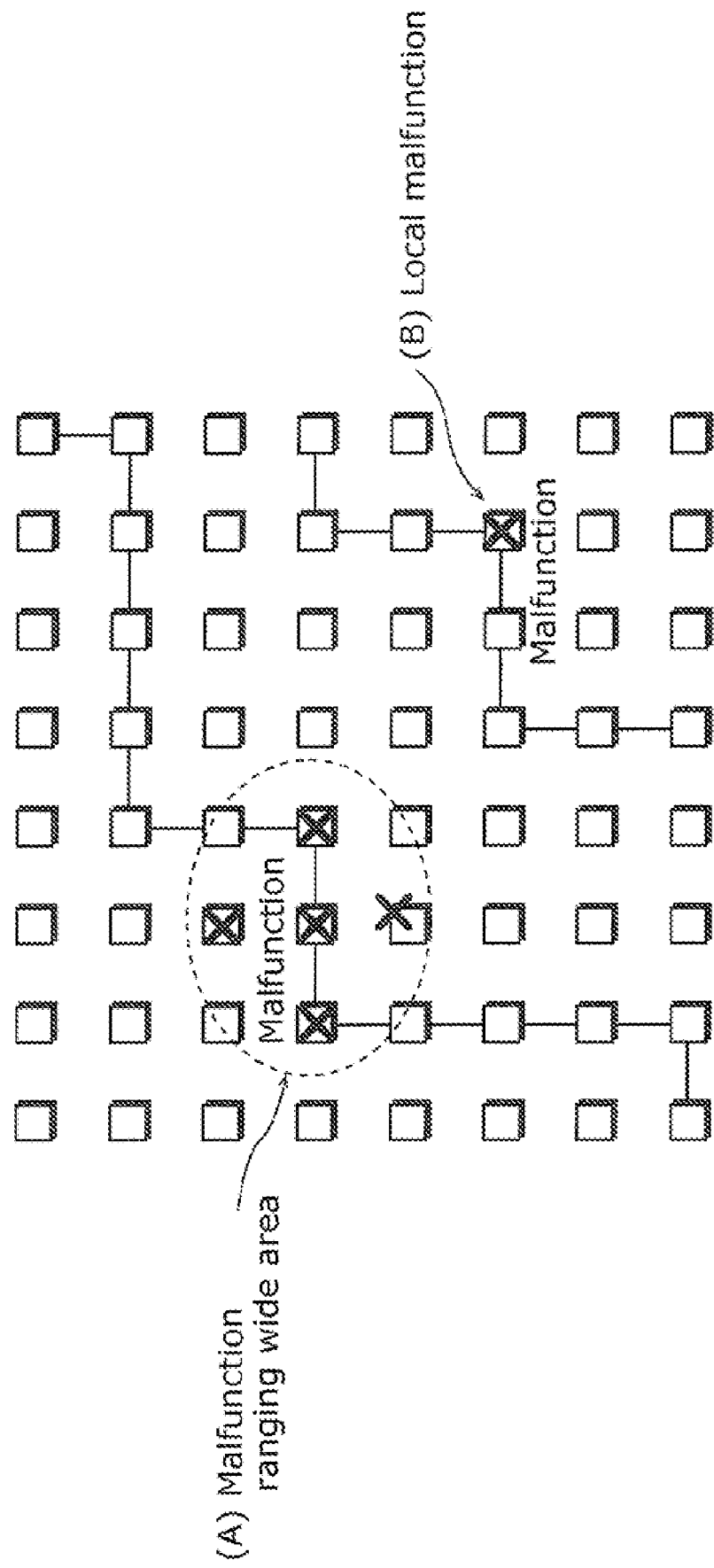
FIG. 22 illustrates how the malfunction occurs in the network.

FIG. 22 illustrates how malfunction occurs in the network.

Malfunctions include a case where the malfunction occurs widely on a relay on the path and a number of neighboring relays (FIG. 22 (A)), and a case where the malfunction occurs locally only on the relay on the path (FIG. 22 (B)). When the malfunction occurs locally, no bypassing is performed in anticipation of recovery in a short time, and bypassing is performed only when the size of malfunction is large. This allows suppressing the degradation on the transmission performance caused by frequent bypassing.

Figure 23:
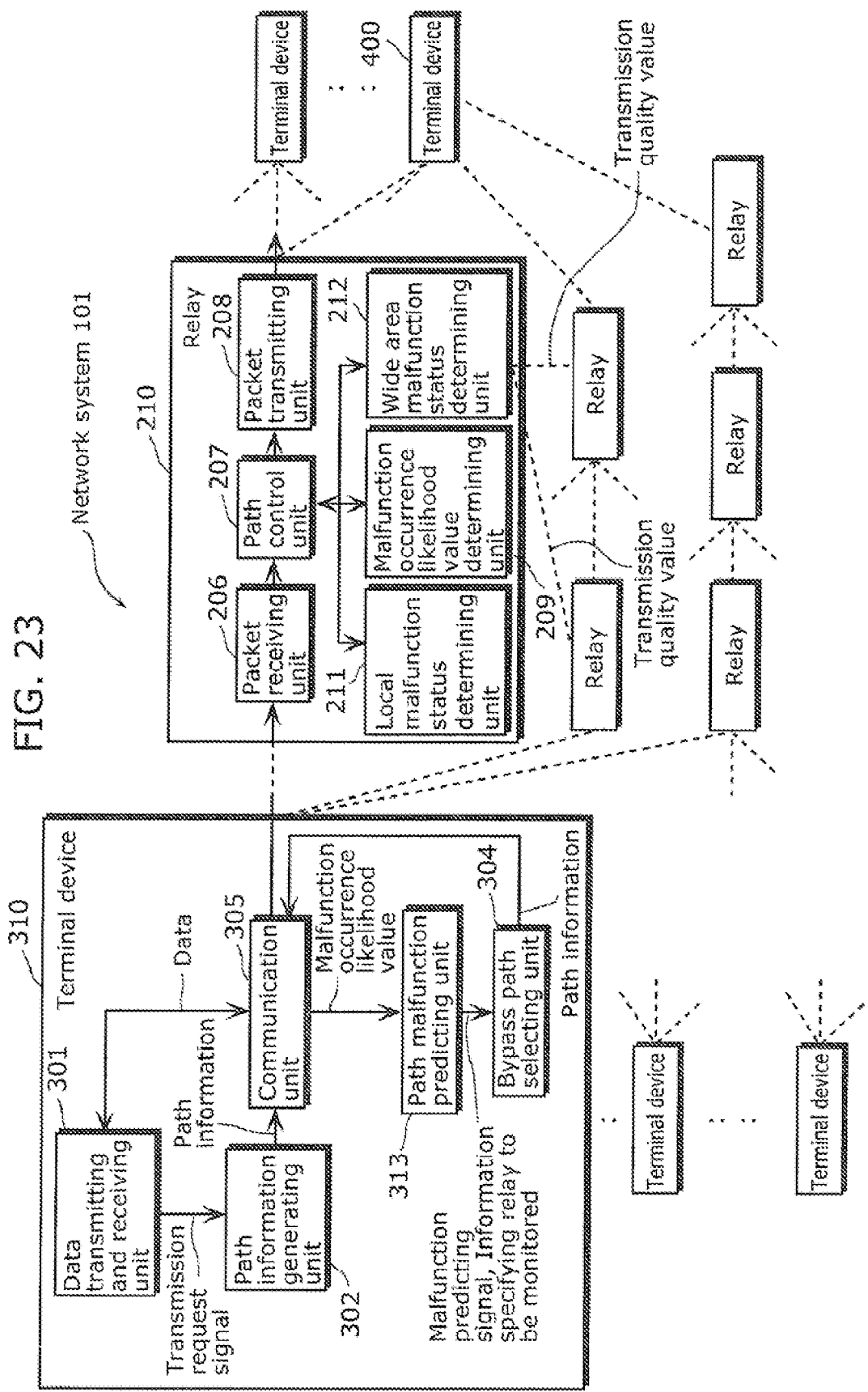
FIG. 23 illustrates an example of the configuration of the network system according to the variation of the present invention.
Figure 24:
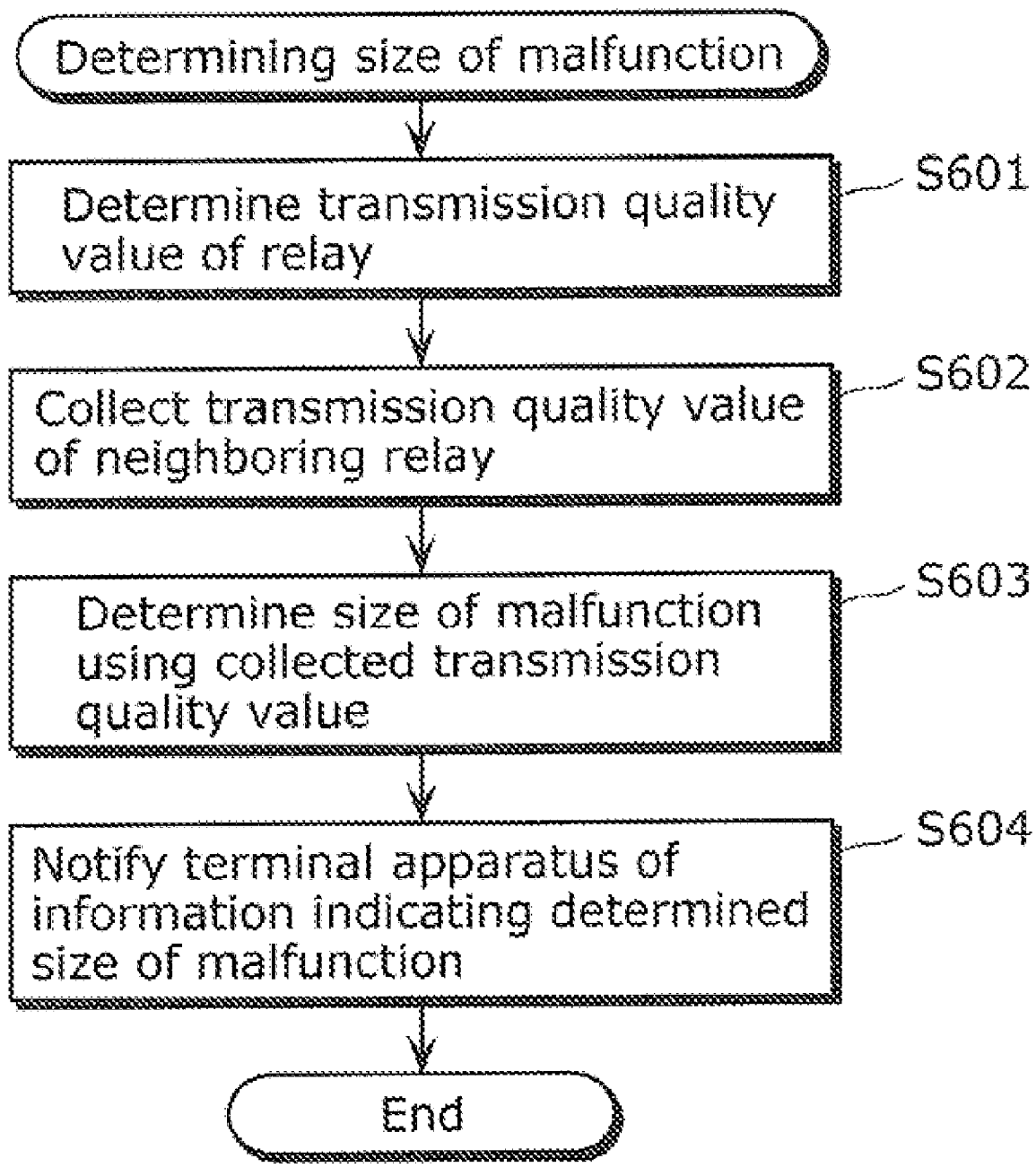
FIG. 24 is a flowchart illustrating an exemplary operation for determining the size of the malfunction.

FIGS. 23 and 24 specifically describe a network system which control paths according to the size of malfunction.

FIG. 23 is a block diagram illustrating an example of the configuration of the network system 101 which determines the size of malfunction and controls paths according to the size of determined malfunction.

The relay 210 in the network system 101 includes a local malfunction status determining unit 211 and a wide area malfunction status determining unit 212, in addition to the components of the relay 200 in the network system 100 in FIG. 4.

The local malfunction status determining unit 211 determines the level of congestion or transmission error in the relay 210, and holds information indicating the result of the determination. The information indicating the level of the congestion is, for example, the buffer usage rate in the relay 210, and the information indicating the level of transmission error is the measurement results such as the transmission error rate, loss rate, and delay time on packet transmission between the relay 210 and other neighboring relays, for example.

The wide area malfunction status determining unit 212 collects information regarding the level of congestion or transmission error from the other relays within a predetermined hop count from the relay 210, and determines whether or not the congestion or transmission error occur widely, using the collected information.

The terminal device 310 in the network system 101 includes, compared to the terminal device 300 in the network system 100 in FIG. 4, the path malfunction predicting unit 313 instead of the path malfunction predicting unit 303.

The path malfunction predicting unit 313 is similar to the path malfunction predicting unit 303 in that the malfunction on the main path is predicted using the malfunction occurrence likelihood value. However, the path malfunction predicting unit 313 differs from the path malfunction predicting unit 303 in that the malfunction size information indicating the size of malfunction is collected from the relay, and using the malfunction size information is used for determining whether or not bypassing is necessary, together with the malfunction occurrence likelihood value.

When the malfunction is predicted by the malfunction occurrence likelihood value collected by the relay on the main path, the path malfunction predicting unit 313 inquires the relay to obtain the malfunction size information indicating the size of malfunction occurring around the relay, the malfunction of which is predicted, to obtain the malfunction size information indicating the size of the malfunction occurring around the relay. Subsequently, when the size of malfunction indicated by the malfunction size information is smaller than the predetermined standard, the path malfunction predicting unit 313 prevents bypassing.

The operations of the relay 210 with the abovementioned configuration shall be described in detail focusing on the difference from the operations of the relay 200 described above.

FIG. 24 is a flowchart illustrating an exemplary operation for determining the size of the malfunction, performed by the relay 210. Note that, the relay 210 performs processes similar to the process by the relay 200 (see FIG. 5), and performs process illustrated in FIG. 24. The description for the process similar to that of the relay 200 is omitted here.

The local malfunction status determining unit 211 measures the transmission error rate, loss rate, delay time and others of the packet in the packet receiving unit 206 and the packet transmitting unit 208, as information regarding the congestion status and the transmission error in the relay 210 (S601).

The wide area malfunction status determining unit 212 collects information regarding the congestion status or transmission error measured by the other relays within a predetermined hop count from the relay 210 (S602).

More specifically, the wide area malfunction status determining unit 212 may collect the information to be notified from the other relays by transmitting inquiry packet to the other relays.

The wide area malfunction status determining unit 212 determines whether or not the congestion or transmission error occurs in a wide area, using the collected information (S603).

The wide area malfunction status determining unit 212 simply determines the number of relays in which the degradation of the transmission error rate, loss rate, and delay time (for example, exceeding the predetermined threshold value), according to the collected information, as the size of malfunction, for example.

Furthermore, the wide area malfunction status determining unit 212 may specify until how many hops away from the relay 210 the relay has successive degradation in the transmission rate, loss rate, and the delay time, and determine the hop count as the size of malfunction.

Furthermore, the wide area malfunction status determining unit 212 may define the collected sum of degrees of degradation in transmission error rates, loss rates, and delay time (for example, the amount exceeding the predetermined threshold) as the level of malfunction, and determines the multiplication of the hop count and the intensity of the malfunction as the size of malfunction.

The wide area malfunction status determining unit 212 notifies the terminal device 310 of the malfunction size information indicating the determined size of malfunction, in response to the inquiry from the terminal device 310 (S604).

The path malfunction predicting unit 313 in the terminal device 310 determines whether or not bypassing is necessary using the malfunction size information indicating the size of malfunction, which is notified as described above, together with the malfunction occurrence likelihood value.

For example, suppose the malfunction size information notified from the relay on the main path is a value indicating until how many hops away the relay has successive congestion or transmission error. When the value is 0, the path malfunction predicting unit 313 determines that no malfunction is occurring, or even if there is malfunction, short-term recovery is expected because the malfunction is limited to the relay on the main path, and does not instruct the bypass path selecting unit 304 to bypass the path.

On the other hand, when the above-described value is 1 or more, the path malfunction predicting unit 313 determines that the malfunction ranging wide area is occurring around the relay on the main path and the recovery is not expected. Subsequently, the path malfunction predicting unit 313 instructs the bypass path selecting unit 304 to perform bypassing.

Note that, the malfunction size information notified from the relay on the main path may not only be used for determining whether or not the bypassing is necessary, but also for selecting the bypass path that should be a new main path.

More specifically, when the malfunction size information notified from the relay on the main path indicates the wide malfunction around the relay on the main path, the bypass path selecting unit 304 selects a path with the largest hop count among the bypass paths.

Such a bypass path is highly likely to be away from the main path. Thus, the bypass path less subject to the malfunction occurring around the relay on the main path is likely to be selected as a new main path.

Conclusion

As described above, the path control device according to the present invention predicts malfunction on the relay using the flow count to be relayed by the relay as the malfunction occurrence likelihood value, excluding the path including the relay whose malfunction is predicted, and selects a new path that should be used for transmitting data. Thus, it is possible to perform bypassing quickly, before actually degrading the transmission quality or increasing the load, which are reflected on the predetermined statistics.

Furthermore, the malfunction occurrence likelihood value is collected from the relay stochastically selected according to the monitoring frequency in accordance with the likelihood of the malfunction. Thus, it is possible to limit the monitoring cost (amount of monitoring packets, consumption power, time necessary for observation), and to stochastically avoid overlooking malfunction.

[Industrial Applicability]

The path control device according to the present invention is applicable to the network system such as the mesh network.

[Reference Signs List]

100, 101 Network system
106 Malfunction occurrence likelihood value obtaining unit
107 Malfunction occurrence likelihood value storage unit
109 Activation level calculating unit
110 Monitoring frequency value updating unit
111 Monitoring frequency value storage unit
112 Selection probability value generating unit
113 Monitoring object selecting unit
200, 210 Relay
206 Packet receiving unit
207 Path control unit
208 Packet transmitting unit
209 Malfunction occurrence likelihood value determining unit
211 Local malfunction status determining unit
212 Wide area malfunction status determining unit
300, 310, 400 Terminal device
301 Data transmitting and receiving unit
302 Path information generating unit
303, 313 Path malfunction predicting unit
304 Bypass path selecting unit
305 Communication unit

The invention claimed is:

1. A path control device which controls a path for transmitting data from a transmission terminal to a reception terminal through relays, said path control device comprising:
   a path information generating unit configured to generate path information indicating paths for transmitting the data from the transmission terminal to the reception terminal;
   a path malfunction predicting unit configured to predict a malfunction of each of the relays, using the number of flows as a malfunction occurrence likelihood value which represents a likelihood of a malfunction of the relay, including a degradation in transmission quality and increased load, each of the flows being a sequence of one or more packets to be relayed from one transmission source to one destination by the relay which is a candidate for monitoring, wherein at least one candidate for monitoring is determined for each path indicated by the path information; and
   a bypass path selecting unit configured to select, based on the malfunction occurrence likelihood value, a path that should be used for transmitting the data from the transmission terminal to the reception terminal.

2. The path control device according to claim 1,
wherein said path malfunction predicting unit is configured to use, as the malfunction occurrence likelihood value, the number of flows relayed by each of the relays except the flow from the transmission terminal to the reception terminal.

3. The path control device according to claim 1,
wherein said path malfunction predicting unit is configured to use, as the malfunction occurrence likelihood value, the number of flows each of which is with a transmission band on a communication line for transmission narrower than a transmission band on a communication line for reception, among the flows relayed by each of the relays.

4. The path control device according to claim 1,
wherein said path malfunction predicting unit includes:
   a monitoring frequency value storage unit configured to store a monitoring frequency value indicating a frequency for monitoring a malfunction occurrence likelihood value of each of the relays that is the candidate for monitoring;
   a selection probability value generating unit configured to generate a selection probability value which is a predetermined probability value for each of the relays;
   a monitoring object determining unit configured to determine a relay whose malfunction occurrence likelihood is to be monitored, according to the monitoring frequency value and the selection probability value;
   a malfunction occurrence likelihood value obtaining unit configured to obtain a malfunction occurrence likelihood value from the relay determined by said monitoring object determining unit;
   a malfunction occurrence likelihood value storage unit configured to store the obtained malfunction occurrence likelihood value;
   an activation level calculating unit configured to calculate, using the stored malfunction occurrence likelihood value, an activation level indicating validity of the monitoring frequency value stored in said monitoring frequency value storage unit; and
   a monitoring frequency value updating unit configured to update the monitoring frequency value stored in said monitoring frequency value storage unit, based on the activation level.

5. The path control device according to claim 1,
wherein said bypass path selecting unit is configured to determine a transmission quality value indicating transmission quality of each of the relays that is the candidate for monitoring, and
to select a path that should be used for transmitting the data from the transmission terminal to the reception terminal, from paths excluding a path including a relay with transmission quality below a predetermined threshold, the transmission quality being indicated by the determined transmission quality value.

6. The path control device according to claim 5,
wherein said bypass path selecting unit is configured to collect a load value indicating a level of load in a relay, from each of the relays that is the candidate for monitoring, and
to select a path that should be used for transmitting the data from the transmission terminal to the reception terminal, from paths further excluding a path including a relay with a level of load smaller than a predetermined threshold, the level of load being indicated by the collected load value.

7. The path control device according to claim 1, wherein said path malfunction predicting unit is configured to obtain malfunction size information indicating a size of malfunction occurring around the relay on which the malfunction is predicted, and to prevent said bypass path selecting unit from selecting the path, when the size of malfunction indicated by the obtained malfunction size information is smaller than a predetermined threshold.

8. The path control device according to claim 1, wherein said path malfunction predicting unit is configured to obtain malfunction size information indicating a size of malfunction occurring around the relay on which the malfunction is predicted, and said bypass path selecting unit is configured to select a path which has a largest hop count from the paths indicated by the path information except the path including the relay on which the malfunction is predicted, when the size of malfunction indicated by the obtained malfunction size information is above a predetermined threshold.

9. The path control device according to claim 1, wherein said path control device is provided on the transmission terminal or one of the relays.

10. The path control device according to claim 1, wherein, when the malfunction is predicted for at least one relay which is the candidate for monitoring, said bypass path selecting unit is configured to exclude, from the paths indicated by the path information, a path including the relay on which the malfunction is predicted, and select a path that should be used for transmitting the data from the transmission terminal to the reception terminal.

11. A path control method for controlling a path for transmitting data from a transmission terminal to a reception terminal through relays, said path control method comprising:
generating path information indicating paths for transmitting the data from the transmission terminal to the reception terminal;
predicting, using a processor, a malfunction of each of the relays, using the number of flows as a malfunction occurrence likelihood value which represents a likelihood of a malfunction of the relay, including a degradation in transmission quality and increased load, each of the flows being a sequence of one or more packets to be relayed from one transmission source to one destination by the relay which is a candidate for monitoring, wherein at least one candidate for monitoring is determined for each path indicated by the path information; and
selecting, based on the malfunction occurrence likelihood value, a path that should be used for transmitting the data from the transmission terminal to the reception terminal.

12. A non-transitory computer-readable recording medium for use in a computer, the recording medium having a computer-executable program recorded thereon, said computer-executable program being for controlling a path for transmitting data from a transmission terminal to a reception terminal through relays, said computer-executable program causing a computer to execute:
generating path information indicating paths for transmitting the data from the transmission terminal to the reception terminal;
predicting a malfunction of each of the relays, using the number of flows as a malfunction occurrence likelihood value which represents a likelihood of a malfunction of the relay, including a degradation in transmission quality and increased load, each of the flows being a sequence of one or more packets to be relayed from one transmission source to one destination by the relay which is a candidate for monitoring, wherein at least one candidate for monitoring is determined for each path indicated by the path information; and
selecting, based on the malfunction occurrence likelihood value, a path that should be used for transmitting the data from the transmission terminal to the reception terminal.

13. A path malfunction predicting device which predicts a malfunction in a path for transmitting data from a transmission terminal to a reception terminal through relays, said path malfunction predicting device comprising:
a path information generating unit configured to generate path information indicating paths for transmitting the data from the transmission terminal to the reception terminal; and
a path malfunction predicting unit configured to predict a malfunction of each of the relays, using the number of flows as a malfunction occurrence likelihood value which represents a likelihood of a malfunction of the relay, including a degradation in transmission quality and increased load, each of the flows being a sequence of one or more packets to be relayed from one transmission source to one destination by the relay which is a candidate for monitoring, wherein at least one candidate for monitoring is determined for each path indicated by the path information.

\* \* \* \* \*